US011461829B1

(12) United States Patent
Wang et al.

(10) Patent No.: US 11,461,829 B1
(45) Date of Patent: Oct. 4, 2022

(54) MACHINE LEARNED SYSTEM FOR PREDICTING ITEM PACKAGE QUANTITY RELATIONSHIP BETWEEN ITEM DESCRIPTIONS

(71) Applicant: Amazon Technologies, Inc., Seattle, WA (US)

(72) Inventors: Lichao Wang, Seattle, WA (US); Kai Liu, Bothell, WA (US); Archi Dutta, Shoreline, WA (US); Dmitry Zhiyanov, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 737 days.

(21) Appl. No.: 16/455,601

(22) Filed: Jun. 27, 2019

(51) Int. Cl.
| | |
|---|---|
| *G06Q 30/06* | (2012.01) |
| *G06N 3/08* | (2006.01) |
| *G06F 40/30* | (2020.01) |
| *G06N 3/04* | (2006.01) |
| *G06F 40/284* | (2020.01) |

(52) U.S. Cl.
CPC ....... *G06Q 30/0635* (2013.01); *G06F 40/284* (2020.01); *G06F 40/30* (2020.01); *G06N 3/04* (2013.01); *G06N 3/08* (2013.01); *G06Q 30/0603* (2013.01); *G06Q 30/0625* (2013.01)

(58) Field of Classification Search
None
See application file for complete search history.

(56) References Cited

U.S. PATENT DOCUMENTS

| | | | |
|---|---|---|---|
| 9,430,569 B2 | 8/2016 | Rubanovich et al. | |
| 9,569,700 B1 * | 2/2017 | Santos | G06V 10/454 |
| 10,042,895 B1 * | 8/2018 | Geva | G06F 16/24 |
| 10,235,449 B1 * | 3/2019 | Viswanathan | G06F 40/117 |
| 10,235,711 B1 * | 3/2019 | Koduvayur Viswanathan | |
| | | | G06Q 30/0623 |

(Continued)

OTHER PUBLICATIONS

Ristoski, Petar, Petar Petrovski, Peter Mika, and Heiko Paulheim. "A machine learning approach for product matching and categorization." Semantic web 9, No. 5 (2018): 707-728. (Year: 2018).*

(Continued)

*Primary Examiner* — Frank D Mills
(74) *Attorney, Agent, or Firm* — Robert C. Kowert; Kowert, Hood, Munyon, Rankin & Goetzel, P.C.

(57) ABSTRACT

Systems and methods are disclosed to implement a machine learned system to determine the comparative relationship between item package quantity (IPQ) information indicated in two item descriptions. In embodiments, the system employs a neural network that includes a token encoding layer, an attribute summarizing layer, and a comparison layer. The token encoding layer accepts an item description as a token sequence and encodes the tokens with token attributes that are relevant to IPQ extraction. The attribute summarizing layer uses a convolutional neural network to generate a set of fixed-size feature vectors for each encoded token sequence. All feature vectors for both item descriptions are then provided to the comparison layer to generate the IPQ comparison result. Advantageously, the disclosed neural network model can be trained to make accurate predictions about the IPQ relationship of the two item descriptions using a small set of token-level attributes as input signals.

20 Claims, 11 Drawing Sheets

(56) References Cited

U.S. PATENT DOCUMENTS

| | | | | |
|---|---|---|---|---|
| 10,963,687 B1* | 3/2021 | Williams | ............ | G06Q 30/0283 |
| 11,250,082 B2* | 2/2022 | Studnicka | ............ | G06F 16/3334 |
| 2012/0330971 A1 | 12/2012 | Thomas et al. | | |
| 2014/0136541 A1 | 5/2014 | Farahat et al. | | |
| 2016/0110762 A1* | 4/2016 | Mastierov | ............ | G06F 40/211 |
| | | | | 707/739 |
| 2016/0110763 A1* | 4/2016 | Mastierov | ............ | G06Q 30/0255 |
| | | | | 705/14.53 |
| 2016/0314518 A1* | 10/2016 | Goodwin | ............ | G06Q 30/0641 |
| 2016/0321705 A1* | 11/2016 | Scheidelman | ......... | G06F 40/20 |
| 2017/0193465 A1* | 7/2017 | Madura | ............ | G06Q 30/0625 |
| 2017/0270549 A1* | 9/2017 | Jayaveer | ............ | G06Q 30/0629 |
| 2017/0372407 A1* | 12/2017 | Konigsberg | ............ | G06F 40/40 |
| 2018/0047080 A1* | 2/2018 | Piccus | ............ | G06F 8/20 |
| 2018/0157714 A1* | 6/2018 | Wu | ............ | G06Q 30/0633 |
| 2018/0349965 A1* | 12/2018 | More | ............ | G06Q 30/0277 |
| 2019/0278865 A1* | 9/2019 | Hurwitz | ............ | G06F 16/358 |
| 2020/0089800 A1* | 3/2020 | Bhojwani | ............ | G06F 16/23 |
| 2020/0104897 A1* | 4/2020 | Oh | ............ | G06N 7/005 |
| 2020/0211077 A1* | 7/2020 | He | ............ | G06V 10/82 |
| 2020/0387950 A1* | 12/2020 | Ciranni | ............ | G06K 9/6276 |

OTHER PUBLICATIONS

Van Gysel, Christophe, Maarten de Rijke, and Evangelos Kanoulas. "Mix'n match: Integrating text matching and product substitutability within product search." In Proceedings of the 27th ACM International Conference on Information and Knowledge Management, pp. 1373-1382. 2018. (Year: 2018).*

* cited by examiner

MACHINE LEARNED SYSTEM FOR PREDICTING ITEM PACKAGE QUANTITY RELATIONSHIP BETWEEN ITEM DESCRIPTIONS

BACKGROUND

Companies are increasingly storing large volumes of natural language data. An e-commerce company, for example, may maintain large electronic catalogues of items, and a wealth of structured and unstructured data associated these items in the form of item descriptions. In many cases, it may be desirable to perform semantic analysis on the items' descriptions. For example, the item descriptions may be analyzed to find a group of descriptions with matching items. As another example, item descriptions in a large item catalog may be filtered to find a set of comparable items for a comparison analysis. In performing these analysis tasks, it may be necessary to determine the item package quantity information expressed in item descriptions. However, current machine analysis methods are not well adapted to detect such item quantity information, because the information often hinges on just a few words or phrases hidden in the long item description. Programmed or rule-based solutions for determining such information typically suffer from problems such as inadequate applicability or recall, brittleness, or inability to generalize. On the other hand, human analysis of these item descriptions would be cost prohibitive at scale. More practical machine processes are generally needed to extract and analyze item quantity information in item descriptions.

Figure 1:
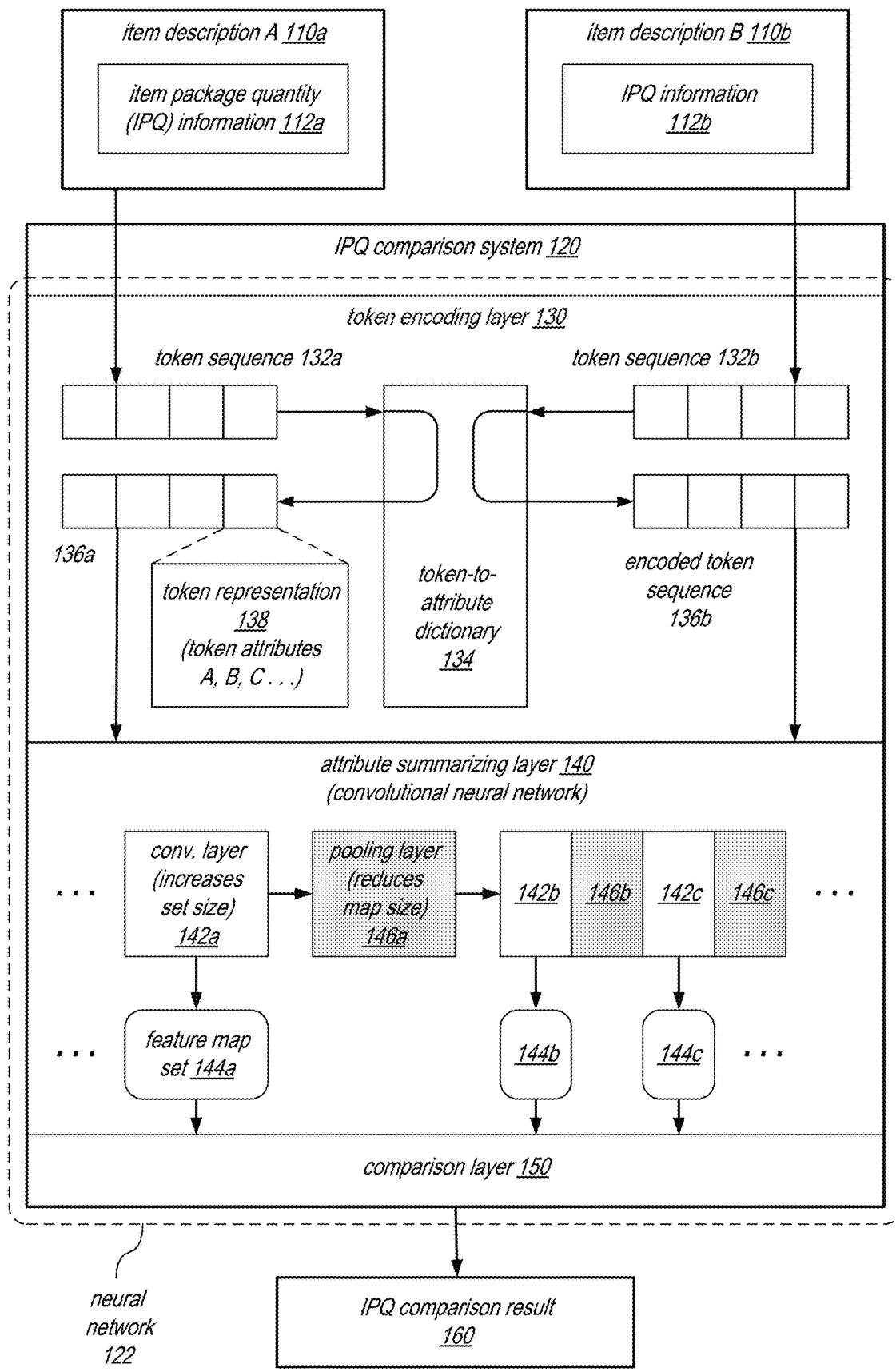
FIG. 1 is a block diagram illustrating an example item package quantity (IPQ) comparison system that uses a machine learned neural network to compare IPQ information in item descriptions using token-level attributes, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement an item package quantity (IPQ) comparison system that uses a machine learned neural network to compare IPQ information in item descriptions using token-level attributes.

Many retail applications perform comparison analysis between matching items. It is sometimes desirable to understand the relation of every aspect of two products or items, including the "item package quantity" or the IPQ of two products or items. For example, one type of comparison analysis could involve a comparison between two item offerings of two competitors to determine the parity of the two offerings (e.g., the weight of the item(s), the overall dimensions of the item(s), the overall packaging dimensions to ship the item(s), a shipping fee to deliver the items, an overall price for the item(s), a per-unit price for the item(s), etc.). To perform such comparison analysis, a comparison of the IPQ information of the two item offerings is generally needed. For example, in some applications, only item offerings having the same IPQ should be used for a comparison. In some applications, item descriptions are considered to be a "match" only when their respective IPQ information are the same. The IPQ relationship between two item descriptions are used in a variety of machine learning applications such as item deduplication, which saves computing resources, such as memory and network resources, and others, such as automated item description verification.

However, machine learning models for automatic product matching are not well adapted to detect such item quantity information. In particular, many current models are focused on aspects other than item package quantity. These models do not do a good job of recognizing IPQ indicators in an item description, which may hinge on just a few words or phrases in the long item description. As a result, although they can tell whether two item descriptions are describing the same type of item, the models do not accurately detect whether two items have the same quantity.

Accordingly, the system and methods disclosed herein provide an IPQ comparison system that uses a machine learned model that is specifically adapted to determine the IPQ relationship between two item descriptions. The disclosed system and machine learned model would substantially improve the precision of automatic product matching, as well as a number of other processes related to computer systems that manage product listings.

For example, the task of navigating a large electronic catalog of items (e.g., a catalog with thousands, millions, or billions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. The user may also need to try to filter results by selecting certain attributes, such as item count. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

In some embodiments, the techniques and user interfaces of the type disclosed herein significantly reduce this problem, allowing users to locate items of interest with fewer steps. For example, in the embodiments described herein, when the user is presented with one or more matching items, each item includes, or is in the form of, a link to the catalog's item detail page for the corresponding item, allowing the user to navigate directly to this page. Each matching result thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the items via the browse tree or via searching or filtering. This can be particularly true for computing devices with small screens, where fewer items can be displayed to the user at a time and thus navigation of larger volumes of items is more difficult.

In some embodiments, an IPQ comparison system may be implemented using a machine learning model as disclosed herein (e.g. a machine-learned neural network) to determine the IPQ relationship between two item descriptions. For example, the IPQ comparison system may determine whether two item descriptions specify the same quantity or units or items, or not. In some embodiments, the IPQ comparison system may also be configured to indicate more detailed relationships between the two item descriptions, such as which of the two description has a greater IPQ. In some embodiments, the input item descriptions may include either structured or unstructured textual or natural language data. In some embodiments, an input item description may include multiple fields of textual or natural language data, such as a title for the item, an unstructured textual description of the item, customer feedback about the item, etc.

In some embodiments, the IPQ comparison system may tokenize each of the input item descriptions into a respective sequence of tokens, which may be words, phrases, etc., depending on the embodiment. In some embodiments, the tokenization process may split an input text into tokens based on delimiters including punctuation characters such as comma and semicolon. In some embodiments, the tokenization process may keep a special set of punctuation characters and treats them as non-delimiters, including for example periods (".") and forward slashes ("/"). In some embodiments, because these characters are commonly used in phrases that describe an item's IPQ, they are not used as delimiters so as to not break up these IPQ phrases into separate tokens. In some embodiments, some special punctuation characters (e.g. "/") may be retained as its own token, or replace with an equivalent word (e.g. "per").

The IPQ comparison system may then generate token representations for each token, where each token representation includes a set predictors or token-level attributes. In some embodiments, the token attributes may be generated by a token encoding layer of a neural network. In some embodiments, the token attributes may specify descriptors or properties about tokens that indicate the tokens' relevance to IPQ information. Depending on the embodiment, these token attributes may include one or more of: whether a token is an integer number that is a frequent IPQ number, whether the token means a unit (e.g., "pack" or "box"), whether the token is a noun plural, whether the token often appears next to an IPQ-like number but is typically not related to IPQ (e.g., "age" or "SPF"), whether the token means the quantity "one." In some embodiments, the token attributes may also include a linear embedding of the token, such as a word2vec embedding or the Global Vectors for Word Representation (GloVe) embedding for the token. In some embodiments, the set of token attributes may also include attributes indicating the number of characters in the token, the capitalization information of the token, and whether this token exists in any attribute in the other item under comparison. In some embodiments, the encoding may be performed mechanically, for example, using a token-to-attribute dictionary or mapping function.

As discussed, in some embodiments, the IPQ comparison system may employ a machine learned neural network. In some embodiments, the neural network may employ a neural network architecture that includes one or more token encoding layers, as discussed, one or more attribute summarizing layers, and a comparison layer. In some embodiments, the neural network may include different token encoding layers and attribute summarizing layers for each input item description. In some embodiments, a single token encoding layer or a single attribute summarizing layer may be implemented for both of the input item descriptions.

In some embodiments, the attribute summarizing layer may be used to receive an encoded token sequence produced by the token encoding layer, and summarize the encoded token sequence to produce a set of fixed-size feature vectors for the token sequence. In some embodiments, the attribute summarizing layer may include a convolutional neural network or CNN. The CNN may include a stack of convolution layers and max pooling layers, where the convolution layers apply a set of filters or kernels to the encoded sequence or input feature map, and the max pooling layers downsample the encode sequences or input feature map. In some embodiments, the CNN may also include a number of global max-pooling layer that extracts the maximum activation of an input sequence or feature map to generate one of the fixed-size feature vectors. In some embodiments, the weights of all the stacks may be shared across all attributes and both items descriptions under comparison.

In some embodiments, the comparison layer may be used to receive the fixed-size feature vectors produced by the attribute summarizing layer(s). In some embodiments, the comparison layer may include a set of fully-connected layers, to accept as the input the concatenation of all feature vectors generated by the CNN for both item descriptions. In some embodiments, the comparison layer may use the input to generate an IPQ comparison result for the two item descriptions. In some embodiments, the IPQ comparison result may indicate a Boolean value (e.g. matching or non-matching). In some embodiments, the IPQ comparison result may indicate more detailed IPQ relationship information, such as which of the two item descriptions indicates a greater IPQ value.

In some embodiments, the described neural network may be trained using a collection of previously labeled ground truth data (e.g. item description with known IPQ values) to tune the model parameters (e.g. the node weights of the CNN). In some embodiments, the training process may also include a model selection step that selects from different versions of models under training or selectively turns on or off different portions of the model (e.g. different token attributes) based on model performance during training. In some embodiments, the training process may also involve the machine supervised tuning of various hyperparameters, such as the number of layers in the CNN, the number or size of the kernels used by the various convolution layers, the window size of the various pooling layers, etc., to produce the ultimate model.

As may be understood, the IPQ comparison system and the machine learned IPQ comparison model described herein improve the functioning of various types of computer systems to provide a number of practical benefits to these systems.

In one respect, embodiments of the IPQ comparison system and the associated machine learning model allows companies to automatically and accurately detect whether two item descriptions have matching or different in item package quantities. This capability allows many types of computer systems to implement functionalities that were not previously possible. For example, with the IPQ comparison system, companies can implement sophisticated matching systems (e.g., item matching, item substitutability, shipping cost matching, price matching, etc.). In some embodiments, the matching system may automatically select groups of item offerings that are the most appropriate to compare, and automatically adjust attributes, such as shipping costs, packaging size, price, etc., of various item offerings based on its matching peers.

As another example, computer systems may be implemented to automatically and accurately detect IPQ variants of the same item in a system (e.g. an item catalog used an e-commerce website), to allow sellers or administrators associated with the website to quickly detect such variants and take appropriate actions. For example, in some embodiments, a computer system may be implemented to automatically flag a new item as an IPQ variant of an existing item (e.g. by taping two one-pack items together), or reject the new item based on its description.

As another example, in some embodiments, the IPQ comparison system may be implemented as a service that is available for use by different types of users or other services. In some embodiments, the IPQ comparison service may be used to enhance a seller's item listing experience on an item listing website. For example, in some embodiments, when a seller lists a new item, the item listing website may use the IPQ matching service to check whether the new item is an impermissible, undesirable, or unintentional IPQ variant of an existing item, or to perform a search of the same item with matching IPQs and display the matches to the seller. The seller may then use the returned matching item descriptions to adjust the attributes of the new item.

In another respect, the IPQ comparison model described herein may be implemented as a reusable component model that can be used to answer the specific IPQ question in a variety of other models. In some embodiments, the IPQ comparison model may be easily added as a part of a larger machine learning models or decision-making systems, without having to train those larger models on the specific question of IPQ. For example, larger models for product matching can easily be built on top of the IPQ comparison model, and use the IPQ comparison result as a factor in their decision-making.

Unlike traditional programmed or rule-based solutions, the machine learning approach can be easily used to create a large number of customized IPQ matching models that are trained to operate under different circumstances. For example, one matching model may be trained for customers in one country or region, and another prediction model may be trained for customers in a different country or region. As another example, different models may be trained for different categories of items. Such customizations are not easily accomplished in traditional programmed or rule-based systems.

Furthermore, unlike traditional programmed solutions, a machine learned model in this context can be easily modified over time with further training, for example, to adapt to the changing nature of the item description data. In some embodiments, the IPQ matching model can be easily modified to include additional types of token attributes. Such modifications are difficult to achieve in traditional programmed systems, which are difficult to formally verify, and where any minor change to the program code can undermine the correctness or accuracy of the entire system. In some embodiments, the IPQ comparison system can be configured to automatically make minor adjustments to the neural network model over time, based on a monitoring of the model's ongoing performance. These and other features and benefits of the inventive system and method are described in more detail below, in connections with the figures.

FIG. 1 is a block diagram illustrating an example item package quantity (IPQ) comparison system that uses a machine learned neural network to compare IPQ information in item descriptions using token-level attributes, according to some embodiments.

As shown, the figure depicts an IPQ comparison system 120, which may be implemented on one or more computer systems to receive a pair of item descriptions (e.g. item descriptions 110*a* and 110*b*), and generate an IPQ comparison result 160 that indicates whether the two item descriptions indicate a matching IPQ for their respective items. As shown, in some embodiments, the IPQ comparison system 120 may use a machine learned model, such as neural network 122, to generate the IPQ comparison result. In some embodiments, the IPQ comparison system 120 may be configured to accept a large number of input item descriptions, or a variable number of item descriptions, for example, to determine the IPQ relationship among a large set of item descriptions, or to cluster the item descriptions into clusters with matching IPQs.

As shown, the two item descriptions 110*a* and 110*b* may include or specify certain IPQ information 112*a* and 112*b*, respectively. In some embodiments, the item descriptions may describe a particular item, which may include a textual or natural language description. In some embodiments, the item description 110 may be entirely unstructured, and may not include any metadata or structure that is designed to be used by a computer system to parse the description. In some embodiments, the item description may be structured or semi-structured, and include metadata (e.g. different data fields) that separates different portions of the item description. In some embodiments, the item description may include one or more images of items or products. In some embodiments, instead of a textual description, one or both of the item descriptions 110 may include an audio or video description. In some embodiments, a single item description may include descriptions for multiple types of items. In some embodiments, the item description 110 may be created or written to be shown to potential customers of the item, which may be displayed as a webpage on an e-commerce website.

The IPQ information 112*a* and 112*b* may indicate the quantity of a type of item that is described by the respective item description. For example, an item description may indicate that an item includes "six cans" of a beverage. Here, the "six cans" may indicate IPQ information for the item. In some embodiments, the IPQ information may use different types of units or collections to indicate an IPQ quantity. For example, an item description may indicate that the described item includes "six hundred pounds" of feed. As another example, an item description may indicate that the described item includes "a set" of tires. In some embodiments, the IPQ comparison system 120 or neural network 122 may be trained to recognize IPQ quantities that are organized into different collections, but quantitatively the same. For example, in some embodiments, the IPQ comparison system 120 may indicate that "two six-packs" is the same IPQ as "a dozen."

As shown, in some embodiments, the neural network 122 may accept as input the two item descriptions 110*a* and 110*b*. In some embodiments, these descriptions are tokenized into token sequences 132*a* and 132*b*. In some embodiments, this tokenization may occur outside of the neural network 122. In some embodiments, the two input item descriptions may vary in format, and the two item descriptions may be tokenized differently. In some embodiments, the token sequences 132 are provided to a token encoding layer 130 of the neural network 122, which encodes the two token sequences 132*a* and 132*b* into two respective encoded token sequences 136*a* and 136*b*. The encoded token sequences 136 are then provided to a next layer of the neural network 122, which is the attribute summarizing layer 140, as shown.

It is noted that in some embodiments, the token encoding layer 130 may include two separate component neural networks, which mirror each other and be used to process the two input item descriptions in parallel. In some embodiments, there is only one token encoding layer (e.g., a single set of neural network nodes), which is used to process both token sequences for both the input item descriptions in successive fashion.

It is also noted that in some embodiments, the encoding of the token sequence 132 may be performed outside of the neural network 122. For example, in some embodiments, each token may be examined individually using a ruled-based component or module, to mechanically generate a respective encoded token representation for each token. In some embodiments, the encoding process may be performed by a component or module that was not machine trained. For example, the encoding process may be performed according to a specified token-to-attribute dictionary, or using a rule-based mapping function. In some embodiments, the encoding process may use machine learned components that were not trained with the neural network 122. For example, in some embodiments, token representations 138 may include token embeddings that are obtained from a known embedding generation model, such as a word2vec or GloVe model. In some embodiments, these embeddings may be imbued semantic meaning, for example, where two semantically similar or related tokens are assigned embeddings that are similar or close.

As shown, the encoding process may generate a sequence of encoded tokens 136 for each input token sequence 132. In some embodiments, each encoded token in the encoded sequence 136 may correspond to an unencoded token in the token sequence 132. In some embodiments, each encoded token in the encoded sequence 136 may be a token representation 138 of a respective unencoded token. In some embodiments, the token representation may be a numerical vector that encodes various token attributes about the respective token.

Depending on the embodiment, the token representation 138 may include different token attributes indicating information such as whether a token is an integer number that is a frequent IPQ number, whether the token means a unit (e.g., "pack" or "box"), whether the token is a noun plural, whether the token often appears next to an IPQ-like number but is typically not related to IPQ (e.g., "age" or "SPF"), whether the token means the quantity "one." In some embodiments, the token attributes may also include a semantic embedding of the token, such as a word2vec embedding or a GloVe embedding for the token. In some embodiments, the set of token attributes may also include attributes indicating the number of characters in the token, the capitalization information of the token, and whether this token exists in any attribute in the other item under comparison.

Depending on the attribute, the different token attributes may be encoded differently. In some embodiments, a numerical attribute may be limited to a range, and/or assigned to different subranges. In some embodiments, certain transformations may be applied to an attribute as it is encoded. In some embodiments, categorical attributes may be represented as "one-hot" vectors, where each bit or element the vector indicates one class. In some embodiments, the encoding may be performed mechanically, for example, using a token-to-attribute dictionary 134 or some other token-to-attribute mapping function.

As shown, in some embodiments, the encoding token sequences 136 are passed to one or more attribute summarizing layers 140 of the neural network 122. In some embodiments, a separate and mirror attribute summarizing layer 140 may be provided for each encoded token sequence 136. In some embodiments, there may be only a single attribute summarizing layer 140, which is used for both (or more) encoded token sequences 136.

As shown, in some embodiments, attribute summarizing layer 140 may include a convolutional neural network (CNN), which may be implemented as a subnetwork of the neural network 122. In some embodiments, the CNN may be implemented as two parallel CNNs for the two encoded token sequences. As shown, the CNN may include a series or sequence of layers, which may include convolution layers 142*a*, 142*b*, and 142*c*, and pooling layers 146*a*, 146*b*, and 146*c*. In some embodiments, the CNN may alternate convolution and pooling layers. In some embodiments, the convolution and pooling layers may be ordered in a different order, depending on the model's architecture.

In some embodiments, each convolution layer 142 may apply a set of kernels or filters to summarize its input feature map or token sequence. In some embodiments, the kernel or filter may be applied to a local portion of the token sequence or feature map, or across the entire encoded token sequence 136. In some embodiments, the filtering may be performed according to an activation function performed by nodes in the convolution layer. In some embodiments, the activation function may take all token attributes encoded in neighboring tokens, and generate a new value for the current token, for the particular attribute that is being summarized by that particular CNN. This process takes an input feature map and generates an output feature map. As shown, the convolution layer may use a set of filters or kernels to produce a set 144*a* of feature maps from the one input feature map. Accordingly, the convolution layer 142*a* increases the size of the input feature map by using multiple kernels or filters. In some embodiments, only some convolution layers in the CNN will increase the size of the feature map set 144.

In some embodiments, each pooling layer may be used to downsample the feature maps produced by a previous layer in the CNN. For example, a max-pooling layer may be used to reduce the size of the feature maps in its input feature map set, by extracting the maximum activation of a group of neighboring tokens in a feature map that fall within a window size. In some embodiments, with successive convolution layers and pooling layers, the original encoded token sequence may be progressively reduced in size to produce smaller and smaller feature maps.

As shown, the feature map set 144*a* may be passed down the series of layers to generate other feature map sets 144*b* and 144*c*. At the same time, in some embodiments, a feature map set 144 may also be used to generate output from the CNN, for example, a fixed-size feature vector summarizing the token sequence 136*a*. In some embodiments, every intermediate feature map set 144 generated by the CNN may be used to generate an individual fixed sized feature vector to be provided to the comparison layer. In some embodiments, each convolution layer in the CNN may be connected to a global pooling layer (not shown), which reduces an entire feature map (e.g. a sequence of variable length depending on the encoded token sequence) into a fixed-size feature vector. In some embodiments, the respective fixed-size feature vectors outputted by the global pooling layers are concatenated or otherwise combined, before they are provided to the comparison layer 150.

As shown, in some embodiments, the neural network 122 may include a comparison layer 160. In some embodiments, the comparison layer 150 may be used to receive fixed-sized feature vectors generated from the feature map sets 144 and generate the ultimate IPQ comparison results 160. In some embodiments, the comparison layer 150 may be a dense, fully-connected layer. In some embodiments, the comparison layer may use a softmax layer to convert the input data into a classification output. In some embodiments, the classification output may be a binary classification indicator, for example, indicating whether the two item descriptions 110*a* and 110*b* have matching IPQ information. In some embodiments, the output IPQ comparison result 160 may include multiple classes (e.g. {equal, greater than, less than, indeterminate}). In some embodiments, additional output may be generated from the neural network 122 or the IPQ comparison system 120. Such additional output may include a confidence metric indicating the confidence level of the comparison results 160, according to the model. In some embodiments, the additional input may also include certain intermediate data produced by the model 122, such as for example, the likely token(s) that are determined indicate the IPQ quantity and IPQ unit in the two item descriptions.

Figure 2:
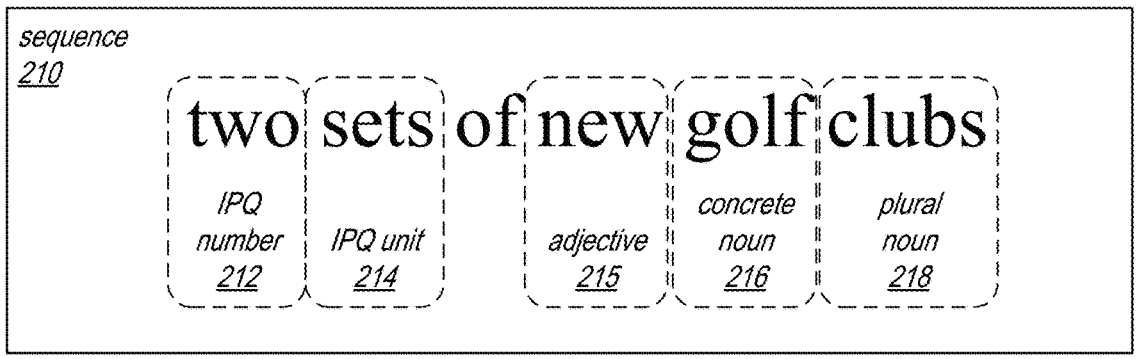
FIG. 2 illustrates a number example token-level attributes that may be used by a machine learned IPQ comparison system, according to some embodiments.
Figure 2:
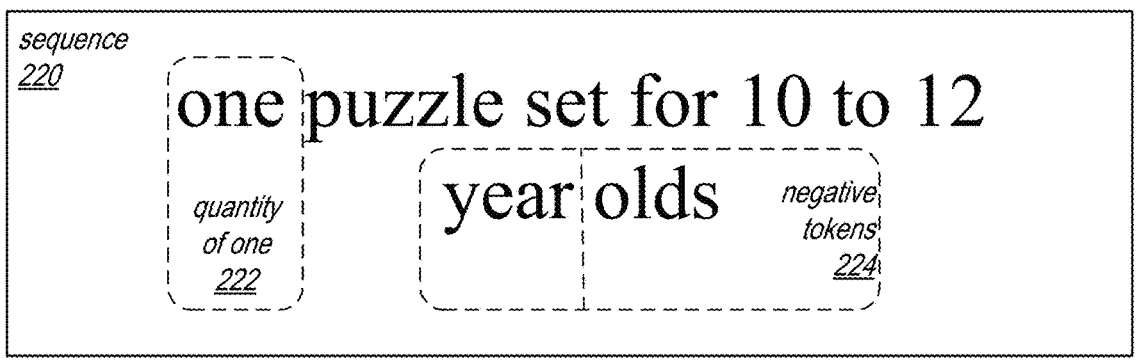
Figure 2:
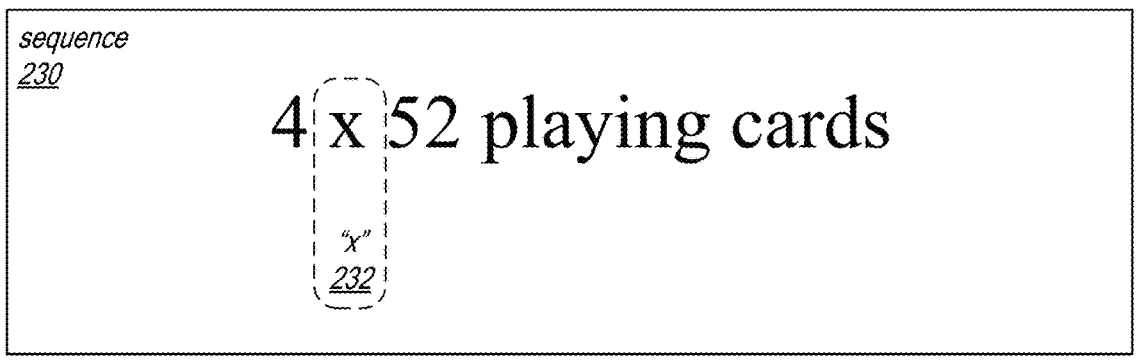
Figure 2:
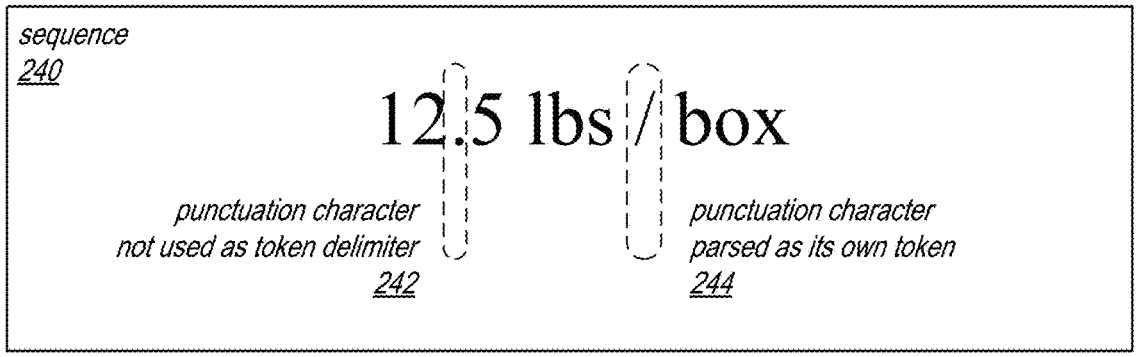

FIG. 2 illustrates a number example token-level attributes that may be used by a machine learned IPQ comparison system, according to some embodiments. The illustrated sequences 210, 220, 230, and 240 may be portions of token sequences 132 provided to the neural network model 122, as discussed in connection with FIG. 1.

Token sequence 210 shows three types of example token attributes that may be used to encode tokens for IPQ comparison system as discussed in connection with FIG. 1. As shown, the token sequence 210 includes the token sequence "two sets of new golf clubs." In this example, each word may be a token. As shown, the word "two" is labeled or encoded with an attribute that indicates the token is a likely number or quantity used to describe IPQs. As shown, the word "sets" is labeled or encoded with an attribute that indicates the token is a likely unit or collection noun used to describe IPQs. As shown, the words "golf" and "clubs" in this example are labeled with an attribute indicator that indicates the two words refer to concrete nouns. In some embodiments, all of these token-level attributes may be determined according to a token-to-attribute dictionary or mapping function, which may determine attributes for a token based on that single token. However, as discussed, these token attributes are then summarized and blended with surrounding context information (e.g. token attributes) or its neighboring tokens by the CNN, to ultimately arrive at a reasonable summary for an attribute for the entire item description sequence. For example, the CNN may ultimately decide that for this item description, the best summary for the IPQ unit attribute is some derived token with the approximate properties of the token "sets", and the best summary for the IPQ number attribute is a derived token with the approximate properties of the token "two."

In some embodiments, the IPQ number or quantity attribute 212 may be a categorical attribute that indicates different types of common numbers, such as 2, 3, 4, 5, 6, 8, 10, 12, etc. However unlikely IPQ quantities (e.g., 2017, 69319) may not be encoded with this attribute. In some embodiments, the dictionary (e.g. dictionary 134) may be built based on the frequency of occurrence of the integers within the available datasets and their neighboring context being relevant to IPQ. Thus, in some embodiments, the attribute assignment process may examine not just the token in question, but also the attributes of nearby tokens. In some embodiments, the dictionary may take into account common synonyms for quantities, such as "pair," "dozen," etc.

In some embodiments, the units for collection nouns attribute may be determined from a dictionary (e.g. dictionary 134) that indicate nouns that are typically used to refer to a collection or package of many smaller items. Examples words in this category may include "pack", "set", "bundle", and "box", etc. In some embodiments, this dictionary may be built based on the frequency of occurrence of these nouns in the available datasets and/or prior knowledge. In some embodiments, the dictionary may also contain the popular synonyms, abbreviations and typos for these nouns.

In some embodiments, another type of token attribute that may be used by the tokenization process may include the token's part-of-speech. For example, in some embodiments, individual tokens may be labeled as nouns (e.g. token attributes 216 and 218), singular or plural nouns, verbs, adjectives (e.g. token attribute 215), adverbs, numbers, or other parts of speech designators. In some embodiments, this part-of-speech attribute may be encoded as a one-hot-vector which indicates one part-of-speech category in a group of possible categories. In some embodiments, these token attributes may be assigned using a dictionary (e.g. dictionary 134) that contains nouns that is typically used to refer to an entity that is described in the item description. Examples of concrete nouns may include words such as "orange", "eraser", "sock", "tire", etc. Examples of adjectives may include words such as "new," "large," "sweet," etc. In some embodiments, this dictionary may be built based on available datasets and/or prior knowledge. In some embodiments, the dictionary may also contain the popular synonyms, abbreviations and typos for these nouns.

As shown, token sequence 220 lists the token sequence "one puzzle set for 10 to 12 year olds." In this example, the token "one" is labeled or encoded with a special attribute indicator 222 that indicates a quantity of one. In some embodiments, this attribute is treated specially from other quantities because words such as "one", "a", or "single" have wider meaning than to just represent quantity. Moreover, some studies show that some error patterns can arise where at least one item description does not have any explicit IPQ information, and the other item description has an explicit IPQ of one. In these cases, the model tends to predict the two descriptions as being IPQ mismatches. Because of these complications with the quantity of one, these types of tokens are labeled with a separate attribute, in some embodiments, and analyzed with its own separate CNN.

As shown, the token sequence 220 also includes two words "year" and "old", which are labeled or encoded as the negative tokens 224. In some embodiments, this attribute may indicate a set of negative words. In some embodiments, the dictionary (e.g. dictionary 134) for this attribute may indicate the words that, if appearing close to an IPQ-like number, indicate that the IPQ-like number is unlikely to be describing IPQ. For example, negative words may include words such as "age", "years", "dollars", and "SPF" describing a sun screen protection rating, etc.

As shown, the token sequence 230 lists the token sequence "4×52 playing cards." In this example, the token "x" is labeled on encoded with a special token attribute indicator 232, which may be reserved for the single letter "x". In some embodiments, the letter "x" may be singled out because it is a commonly used token in the description of IPQs. In some embodiments, other tokens with similar meanings may also be labeled with such an attribute indicator 232, including words such as "per", "/", etc. In some embodiments, during the tokenization process, all such tokens may be replace with a representative token, for example, the word "per".

As shown, token sequence 240 indicates the token sequence "12.5 lbs/box." In this example, the punctuation characters "." and "/" are recognized as secondary punctuation characters. In some embodiments, these types of secondary punctuation characters are designated in a set of such punctuations that are not to be used as delimiters during the tokenization process.

In some embodiments, the tokenization process may be performed using a set of delimiters. In some embodiments, the delimiters used by the tokenization process may include characters such as a dash ("-"), a question mark ("?"), an exclamation mark ("!"), a colon (":"), a semicolon (";"), a whitespace character (e.g. a tab or newline), a parenthesis character ("(" or ")"), a bracket character ("[", "]", "{", "}"), among other characters.

In some embodiments, the "." character 242 is often used as part of a single semantic unit in a textual language description. Accordingly, in some embodiments, the "." character is not used as a delimiter to separate tokens during the tokenization process. Moreover, in some embodiments, the "/" character may represent an individual token on its own. For example, in this case, the "/" character 244 actually means the word "per." Accordingly, in some embodiments, the "/" character is not used as a token delimiter, and may further translated to the word "per" during the tokenization process. In some embodiments, secondary punctuation characters that are not used as token delimiters may include characters such as a period ("."), a space (" "), a comma (","), and a forward slash ("/"), for various reasons.

In some embodiments, the tokenization process may include a normalization step to transform some of the tokens. For example, in some embodiments, all characters in the tokens are converted to lower case. In some embodiments, if a forward slash is followed by any number of spaces and then a recognized collection noun, then the forward slash and its trailing spaces are replaced by the word "per" and one trailing space. In some embodiments, in order to facilitate consumption of the token sequence by the neural network, a special start token is added to beginning of the token sequence, and a special end token is added to the end of the token sequence. In some embodiments, a portion of the tokenization process may be performed by a component or module that is outside the neural network 122. In some embodiments, a portion of the tokenization process is performed by the neural network 122 itself.

Figure 3:
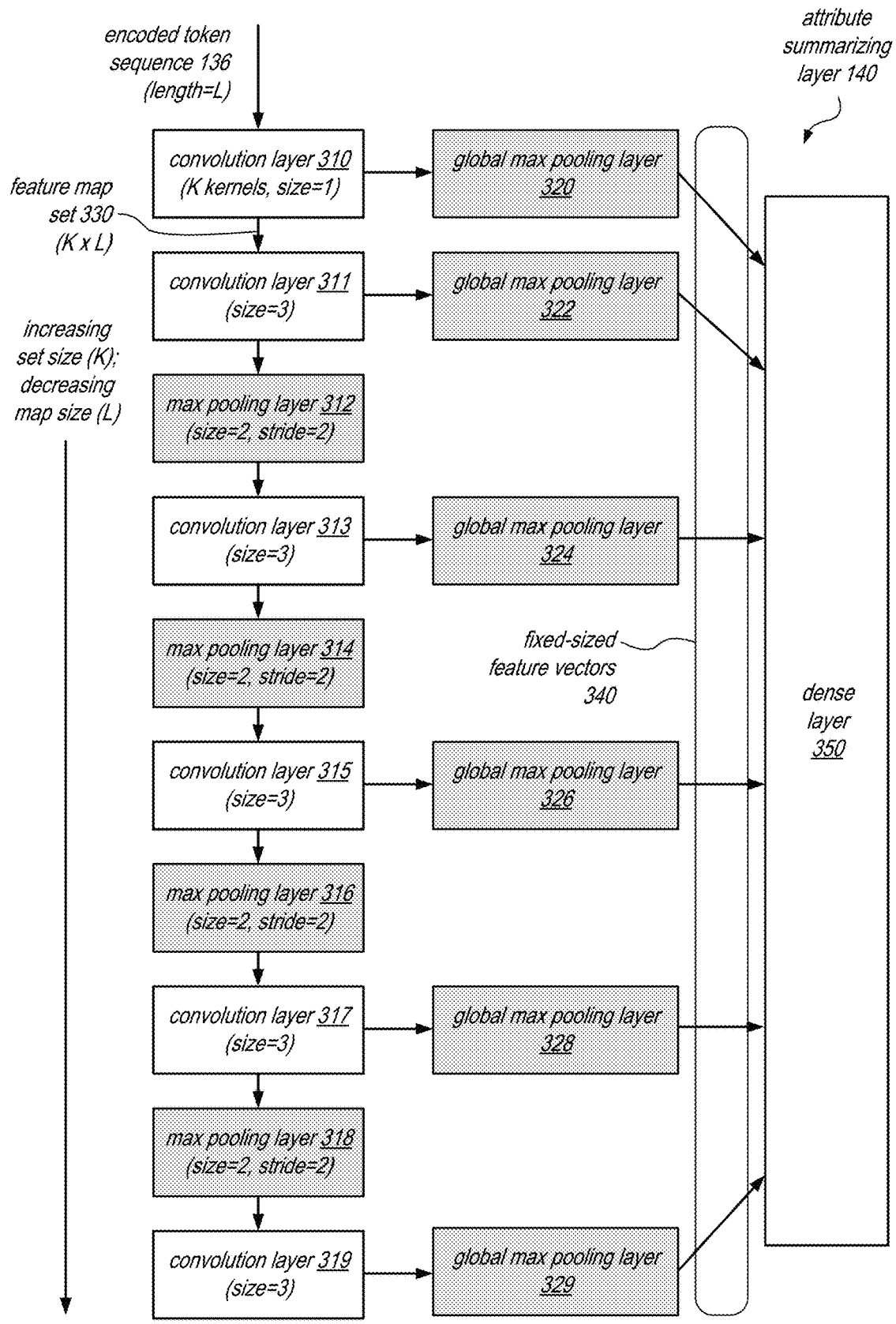
FIG. 3 illustrates an example model architecture for a convolutional neural network (CNN) used in a machine learned IPQ comparison system, according to some embodiments.

FIG. 3 illustrates an example model architecture for a convolutional neural network (CNN) used in a machine learned IPQ comparison system, according to some embodiments. As shown, the figure depicts on a CNN that may be used in the attribute summarizing layer 140 of FIG. 1.

As shown, in this example, the CNN includes a stack or series of convolution layers (layers 310, 311, 313, 315, 317, and 319) and max pooling layers (layers 312, 314, 316, and 318) connected in order. In some embodiments, these layers are not fully connected, in the sense that each layer is only connected to certain localized regions of a preceding layer, to progressively summarize local regions of features outputted by a previous layer. As shown, the output of a previous layer in the series may be a set of feature maps 330, which is used as input to a next layer in the series.

As shown, in this example, an initial convolution layer 310 receives the encoded token sequence 136, which may correspond to either item description 112a or 112b in FIG. 1. As shown, in this example, the first two layers 310 and 311 are both convolution layers. In each convolution layer, a filter or kernel is applied successively to different local regions of the encoded token sequence, to generate the output feature map. Accordingly, the kernel size shown indicates how large the local region used by the filter is. For example, a kernel size of 3 in this example means that the filter or kernel computes a feature unit in the feature map based on three neighboring feature units (e.g. three tokens) in the input feature map or token sequence. In this example, layer 310 uses a kernel or filter size of 1, which means that it generates each feature unit based on individual tokens in the encoded token sequence 136. In this example, all convolution layers use a kernel size of 3, except for the first convolution layer 310. Accordingly, the CNN 144 is effectively "zooming out" from the individual tokens to incorporate more and more surrounding context meaning into the feature units of the output feature map, which summarizes the input feature map or token sequence. In other embodiments, different numbers of convolution layers or different kernel sizes may be used.

In some embodiments, each convolution layer actually generates a set 300 of feature maps. The size or length of each feature map in the set may be dependent on the length of the input token sequence 136 (here length L). In some embodiments, the size of the feature map set 300 (e.g. the number of maps in the set) may be determined by the convolution layer. In some embodiments, each convolution layer may implement a number of filters or kernels (e.g. K kernels for layer 310), so as to produce a set of K feature maps in parallel. This K factor may be different for different convolution layers. Accordingly, as shown in this example, the convolution layer 310 produces a feature map set of K feature maps, where each map has a size or length of L.

As shown, in this example, starting with the convolution layer 311, every convolution layer is following by a max pooling layer, which may be used to downsample the output feature map of the preceding convolution layer. In a max pooling layer, an input feature map is downsampled by examining a window of neighboring feature units in the input feature map as a group, and selecting the feature unit with maximum activation value in the window to include in the output feature map. Accordingly, a salient feature that is present in a small local region (e.g. a small part of a token sequence) becomes a feature of a larger surrounding region. In some embodiments, different types of pooling methods other than max pooling may be used in the pooling layers. In this example, every max pooling layer uses a window size of 2, and a stride size of 2. That is, the max pooling layer selects one output feature unit from a window of two output feature units (e.g. two input tokens), and the window moves or strides two tokens over the token sequence for each output feature unit. As may be understood, using these two values, each max pooling layer in the figure will produce an output feature map that is half the size of the input feature map. Thus, as the processing progress down the stack of series of layers, the intermediate feature maps will be halved in size, starting from the initial sequence length of the encoded token sequence 136. In other embodiments, the number or the parameters of the pooling layers may be different from the illustrated example.

As shown, as additional feature map sets are generated by successive layers down the layer stack, the feature map sets may increase in set size (K), and the map in the set may decrease in map size (L). In some embodiments, each time a convolution layer uses multiple kernels or filters, the size of the feature map set may be increased accordingly. In some embodiments, each time a max pooling layer performs a pooling or downsampling operation on a feature map set, the size of the maps is reduced.

As shown, in this example, each of the convolution layers are connected to a respective global max pooling layer (layers 320, 322, 324, 326, 328, and 329). It is noted that in other embodiments, not all convolution layers may have its own global pooling layer. In some embodiments, these global pooling layers may be pooling layers other than convolutional layers. In some embodiments, the global pooling layers may be similar to the pooling layers (e.g. layers 312, 314, etc.) in the stack, but be structured to reduce an entire variable-length feature map to a fixed-sized feature vector. That is, the global pooling layers will have a window size that is equal to the length or size of the input feature map. The resulting fixed-size feature vector will have a size that is independent from the length of the input token sequence 136, and may encode all information from all feature maps in a feature map set generated by a respective convolution layer. In the case of global max pooling layers, a single feature unit in the input feature map having the maximum activation value is chosen as the output. In this example, six different global max pooling layers are used to reduce the feature map sets produced by the convolution layers to six fixed-size feature vectors. In other embodiments, a different number of global max pooling layers may be used.

In some embodiments, the outputs of the global max pooling layers are further combined or processed in a fully connected or dense layer 350, as shown. In some embodiments, the dense layer 350 may further process these outputs to generate the final feature vector for the encoded token sequence 136. In some embodiments, the neural network 122 may include other intermediate layers that collect the CNN's output(s), before transmitting the summary features for the encoded token sequence to the comparison layer 150.

In some embodiments, in order to train the neural network 122, a data set of item descriptions is built. In some embodiments, each unique item in a set of raw item descriptions (e.g. item listings) may be designated with a unique item ID, which indicates a unique type of item. In some embodiments, each item listing or description may also be associated with a unique listing or description ID.

In some embodiments, a cleanup process is first performed to group item listings or descriptions with the same ID into item groups. In some embodiments, this cleanup process may be performed with a computer system (e.g. a machine learned model), which may also generate a matching score for the item assigned to individual item descriptions.

Then, within each item group, item descriptions with the highest matching scores for the item are used to form description pairs with all other item descriptions in the same item group. From these pairs, a random selection of pairs may be chosen as a training data set for the neural network model. In some embodiment, these pairs may be generated for all item groups in the raw data. In some embodiments, these pairs were manually examined and labeled to indicate whether the two item descriptions were true duplicates (i.e. had matching IPQ information), or IPQ variants. The neural network model 122 may then be trained and/or evaluated using different subsets of the resulting dataset.

Figure 4A:
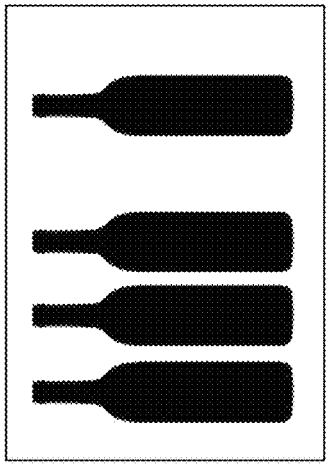
FIG. 4A illustrates an example item description with different fields that can be used as input data to a machine learned IPQ comparison system, according to some embodiments.

FIG. 4A illustrates an example item description with different fields that can be used as input data to a machine learned IPQ comparison system, according to some embodiments. In some embodiments, the item description 400 illustrated in this figure may be used as one of the item descriptions 110a or 110b of FIG. 1.

As shown, the item description 400 may be a structured data description, and include a number of fields. In this example, the fields include an item title 410, a short description 420, a long description 430, a section called "product details" 440, which may include further subfields, a customer questions and answers field 450, and one or more product images 460. As discussed, in some embodiments, at least some of these fields may be provided in a webpage, which may be displayed to customers of an online retail website, third party sellers on the website, etc. In some embodiments, some of the fields of data may be stored in an item catalog, which may be a database system storing descriptions for a large number of items.

As shown, in this example, some of the data fields may be free form or unstructured text fields 422, or natural language data fields. In some embodiments, these data fields may impose little or no constraint on its text or natural language data, other than a length limit. As may be seen, in this example, the item description refers to a type of beverage, and the IPQ information of the item description indicates that there are 4 bottles in the item package. As may be understood, in these types of item descriptions 400, the IPQ information may be expressed differently for different types of items. Moreover, there may be no one place where the IPQ information is indicated, and the IPQ information may be mixed in with long sequences of text. By using the IPQ comparison system described herein, a machine learned model may be applied to this entire item description, and to extract the IPQ information from small phrases in the item description using only a small set of token-level attributes, which may be mechanically applied using a known dictionary.

As shown, in some embodiments, the item description 400 may also include other types of information that may be helpful for IPQ information extraction or comparison. In this example, the item description also indicates certain item packaging information 442, which may also be relevant to the IPQ comparison system 120. For example, in some embodiments, the IPQ comparison system 120 may be configured to use the Universal Product Code (UPC) of the item or the shipping weight of the item in its IPQ comparison. In some embodiments, such additional information may also be used as input data to the neural network 122. In some embodiments, the item packaging data may simply be provided as additional input to later layers of the neural network model, such as for example the comparison layer 150. In some embodiments, this information may be obtained from a separate item packaging data store which stores information for item packaging. For example, in some embodiments, such data may be maintained by a warehouse or fulfillment center that houses packaged items for delivery. In some embodiments, the packages may be labeled with scannable codes, which may be encoded to indicate data such as the UPC code or the item's shipping weight. In some embodiments, the IPQ comparison system 120 may be configured to actively obtain this item packaging data, for example, by querying one or more external databases.

As shown, in some embodiments, the item description 400 may also include other types of data such as customer reviews, customer comments, or customer questions and answers 450 about the item description. In some embodiments, an item catalog may store this type of information as part of the item descriptions' metadata. In some embodiments, this type of information may reside in a separate datastore. In some embodiments, all customer comments for the item description may be provided as input to the IPQ comparison system 120. Accordingly, customer comments that are discussing IPQ information about the item description may also be used by the IPQ comparison system 120.

As shown, in some embodiments, product images 460 may also be used as input data to the IPQ comparison system 120. For example, in some embodiments, an image about an item may actually depict the item in its actual packaging, which can be analyzed to help extract the IPQ information for the item. As shown, in this example, the product image 460 shows 4 bottles of apple cider juice, which matches the indicated IPQ for the item. In some embodiments, image data such as item images may be analyzed using another machine learned model (e.g. another neural network), and the results from the other model(s) may be combined with the results of neural network 122 to perform the IPQ comparison. In some embodiments, these other models may be trained to recognize or detect different objects in the images. In some embodiments, the item description may include data fields of other types of media, such as audio data or video data. In some embodiments, these other types of data may also be analyzed by other types of machine learned models to extract IPQ information about the item description.

Figure 4B:
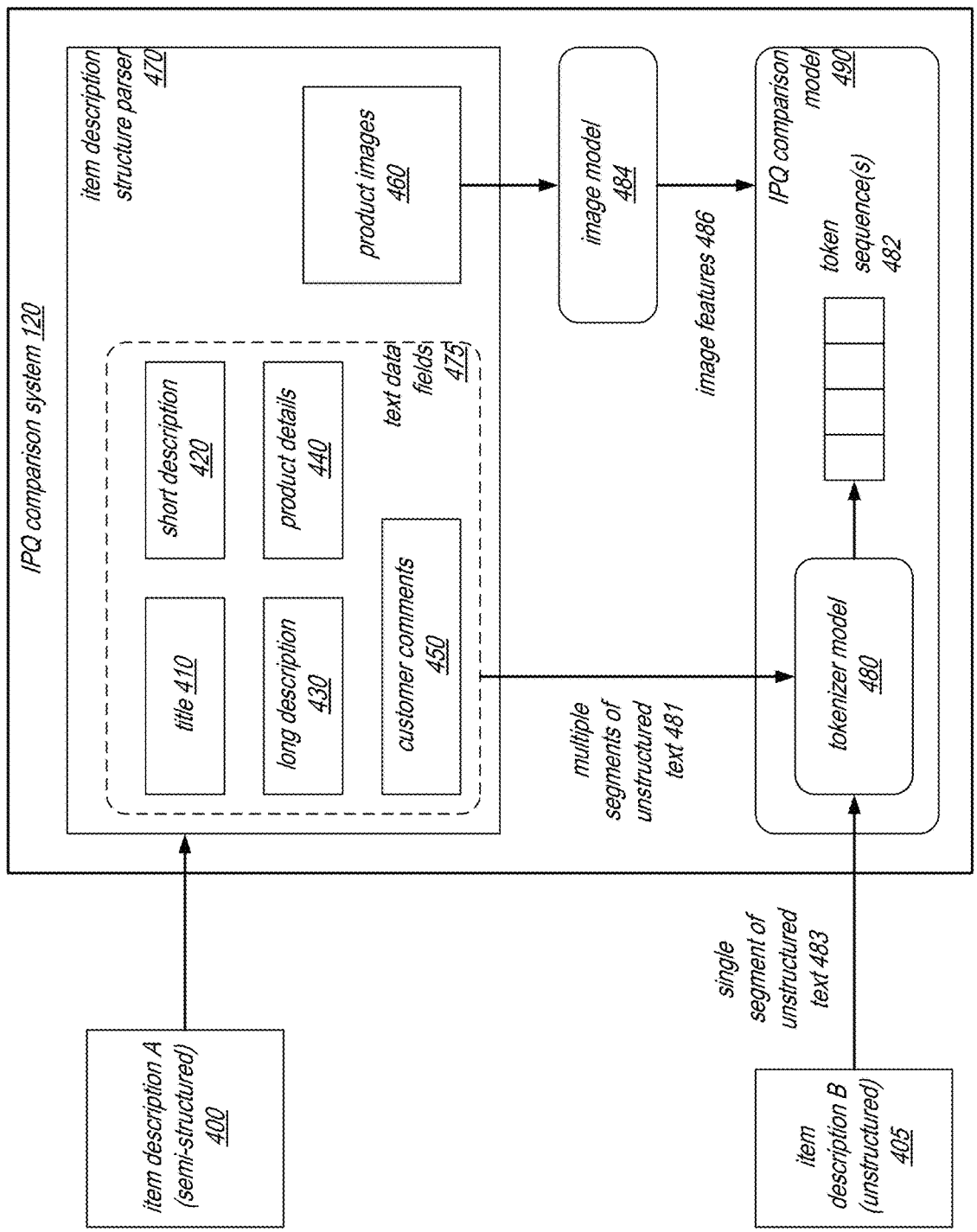
FIG. 4B illustrates an item description structure parser that may be used to parse different item descriptions for a machine learned IPQ comparison system, according to some embodiments.

FIG. 4B illustrates an item description structure parser that may be used to parse different item descriptions for a machine learned IPQ comparison system, according to some embodiments.

As shown, the figure depicts an item description structure parser 470, which may be implemented as part of the IPQ comparison system 120. As shown, the item description structure parser 470 may be programmed as a separate component from the IPQ comparison model 490 to parse an semi-structured item description 400 as discussed in connection with FIG. 4A. In some embodiments, the item description may be a semi-structured to includes multiple fields of unstructured or free-form text. As shown, the semi-structured item description 400 may be parsed to obtain its fields, for example, including its title 410, short description 420, long description 430, product details 440, customer comments 450, and product images 460, in some embodiments.

In this example, fields 410, 420, 430, 440, and 450 are text data fields 475. In some embodiments, all text field data 475 are provided as segments of text 481 to a text tokenizer 480, which tokenizes these the segments to respective token sequences 482, which are used by the rest of the IPQ comparison model 490 (e.g. the neural network 122 of FIG. 1). In some embodiments, individual segments of text 481 may be tagged with a field name that indicates the segment's originating field (e.g. "title", "item_name", "product_description", etc.). As shown, in some embodiments, the tokenizer 480 may be implemented as part of the IPQ comparison model 490, for example, as an initial layer of the neural network 122. In some embodiments, the tokenizer 480 may be implemented as a separate component that is outside of the IPQ comparison model 490. In some embodiments, these token sequences 482 may be provided to the rest of the model 490 one at a time, in successive fashion. In some embodiments, all or some of the token sequences 482 may be concatenated together to form one long token sequence, which may be separated by delimiters (e.g. the field names) for each of the text fields 475, before it is consumed by the rest of the model 940.

As shown, in some embodiments, the IPQ comparison model may be configured to simply receive as input a single segment of unstructured text 483. As shown, in this example, item description B 405 is simply a piece of unstructured text. In some embodiments, this unstructured text 483 describing an item may be provided to the model 490 as is, and the tokenizer model 480 may then tokenize this unstructured text to a single token sequence 482.

As shown, in some embodiments, image data such as the product images 460 may be provided to an image model 484, which may also be a neural network model. In some embodiments, this image model may be separate from the IPQ comparison model 490. In some embodiments, the image model 484 may be included as a subnetwork within the neural network of the IPQ comparison model 490. As shown, the image model 484 may receive the product images 450, possibly as a feature map of pixels, and generate a set of image features 486 as output. In some embodiments, the output may indicate information that may be relevant to the IPQ determination performed by the IPQ comparison model 460. For example, in some embodiments, the image model 484 may use object recognition techniques to determine a count of items seen in the product image 460, which may be helpful to the IPQ comparison model.

Figure 5:
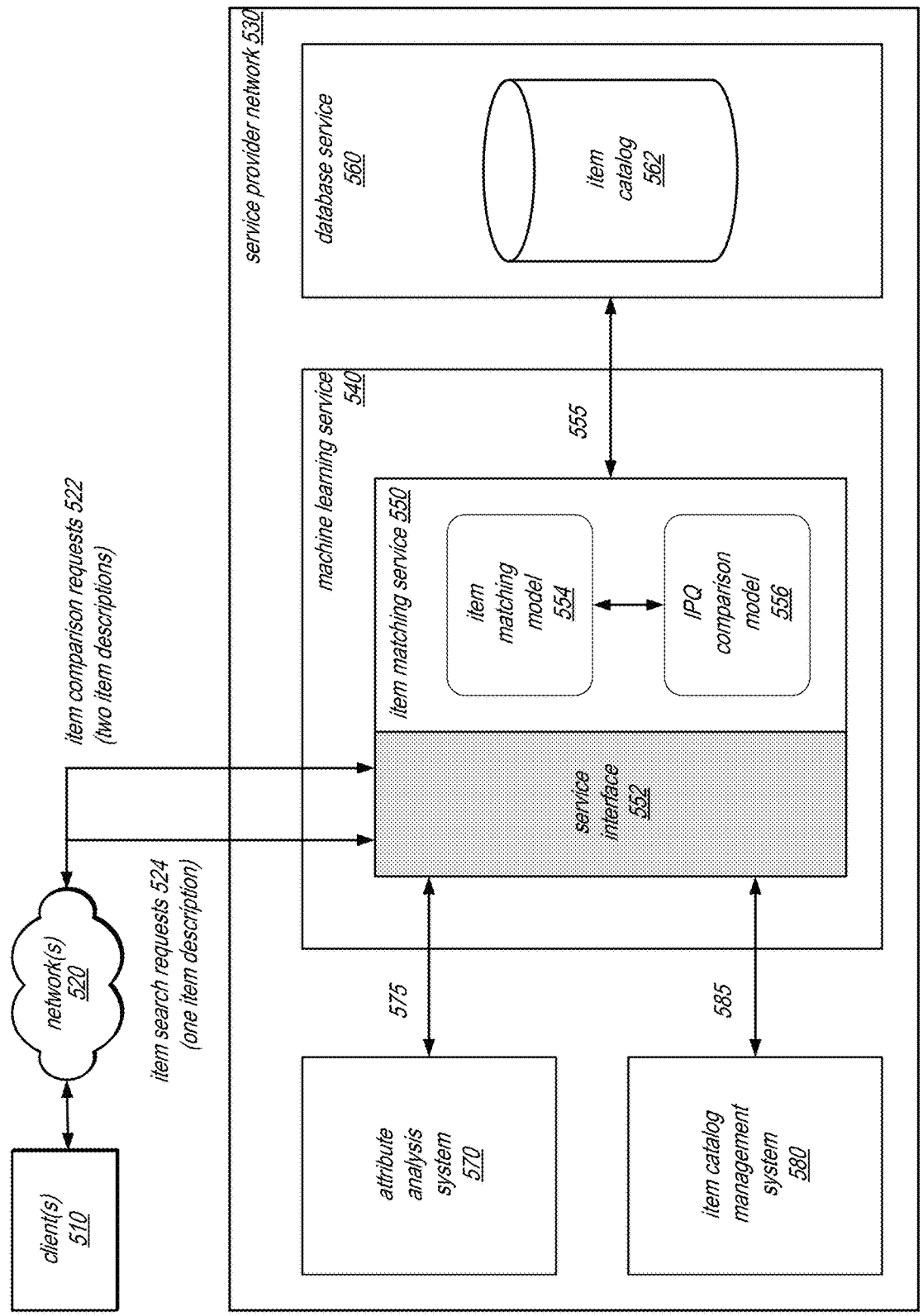
FIG. 5 illustrates a service provider network hosts an item matching service that employs a machine learned IPQ comparison model, according to some embodiments.

FIG. 5 illustrates a service provider network hosts an item matching service that employs a machine learned IPQ comparison model, according to some embodiments.

As shown, in some embodiments, an IPQ comparison model 556 (e.g., the neural network 122 of FIG. 1) may be implement as part of a service. As shown, in this example, the implementing service is an item matching service 550. In some embodiments, the item matching service 550 (or some other service) may implement the IPQ comparison system 120 of FIG. 1. As shown, in some embodiments, the item matching service 550 may be hosted in a service provider network 530, which may be accessible over one or more networks 520 by different clients 510.

In some embodiments, the service provider network 530 may provide computing resources via one or more computing services to the client(s) 510. The service provider network may be operated by an entity to provide one or more services, such as various types of network-accessible computing or storage services, such as the services 540, 550, and 560 shown in this example. In some embodiments, the service provider network may include numerous data centers hosting various resource pools, such as collections of physical and/or virtualized computer servers, storage devices, networking equipment and the like, needed to implement and distribute the infrastructure and services offered by the service provider network. In some embodiments, the service provider network may provide its services using ad hoc computing resources. In some embodiments, these computing resources may be offered to client(s) 510 in units called "instances," such as virtual compute instances.

The client(s) 510 may encompass any type of client configurable to submit requests to the service provider network 530. In some embodiments, a given client 510 may include a suitable version of a web browser or may include a plug-in module or other type of code module configured to execute as an extension to or within an execution environment provided by a web browser. Alternatively, a client 510 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 510 may be configured to generate network-based services requests according to a Representational State Transfer (REST)-style network-based services architecture, a document- or message-based network-based services architecture, or another suitable network-based services architecture. In some embodiments, the service provider network may offer its services as web services, and the client(s) 510 may invoke the web services via published interfaces for the web services. In some embodiments, a client 510 (e.g., a computational client) may be configured to provide access to certain aspects of the services provided in a manner that is transparent to applications implemented on the client(s) 510 utilizing computational resources provided by the service provider network.

In some embodiments, the client(s) 510 may convey network-based services requests to the service provider network via one or more networks 520. In various embodiments, network 520 may encompass any suitable combination of networking hardware and protocols necessary to establish network-based communications between clients 510 and service provider network 530. For example, a network 520 may generally encompass the various telecommunications networks and service providers that collectively implement the Internet. A network 520 may also include private networks such as local area networks (LANs) or wide area networks (WANs) as well as public or private wireless networks. For example, both a client 510 and the service provider network 530 may be respectively provisioned within enterprises having their own internal networks. In such embodiments, the network 520 may include the hardware (e.g., modems, routers, switches, load balancers, proxy servers, etc.) and software (e.g., protocol stacks, accounting software, firewall/security software, etc.) necessary to establish a networking link between the client 510 and the Internet as well as between the Internet and service provider network. In some embodiments, client(s) 510 may communicate with service provider network or CDMS service using a private network rather than the public Internet.

As shown, in some embodiments, an item matching service 550 may use the IPQ comparison model 556 (e.g. the neural network 122) to make item matching determinations. In some embodiments, as shown, the item matching service 550 may implement a service interface 552, which may be invoked by the clients 510, or one or more other systems such as systems 570 and 580, in this example. In some embodiments, the service interface 552 may be implemented as a web services interface. In some embodiments, the service interface 552 may be implemented as a remote procedure call (RPC) protocol or some other network protocol. In some embodiments, the service interface 552 may be implemented as an application programming interface (API), which may be configured to interact with one or more client libraries or modules. In some embodiments, the service interface 552 may implement a graphical user interface (GUI), which may be manipulated by one or more users associated with the clients 510.

In some embodiments, as shown, the clients (or other systems) may issues requests to item matching service 550, including requests such as item comparison requests 522 or item search requests 524. In some embodiments, an item comparison request may specify two (or more) item descriptions, and the item matching service 550 may return an indicator indicating whether the two or more item descriptions represent a match. As shown, the item matching may be performed using an item matching model 554, which may use the IPQ comparison model 556 as part of its matching process, for example, as a sub-model. In some embodiments, the output of the IPQ comparison model (e.g. the IPQ comparison result 160) may be used as an input signal to the rest of the item matching model 554. In some embodiments, the item matching model 554 may also be a machine learned model. In some embodiments, the item matching model 554 may be machine trained using the IPQ comparison model. In some embodiments, the two models 554 and 556 may be trained together. In some embodiments, an item search request 524 may specify only one item description. In some embodiments, the item matching service 550 may perform a search 555 for other item descriptions in an item catalog 562 that match the one input item description. In some embodiments, the matching item descriptions may then be returned to the client 510, in response to the item search request 524.

As shown, in some embodiments, the item catalog 562 may be hosted as a database instance in a database service 560, which may be another type of service provided by the service provider network 530. In some embodiments, the item catalog may store a large number of item descriptions with different IPQ information. In some embodiments, the item catalog may include items that have been listed on an e-commerce website or an authoritative catalog of items provided by a vendor of the items.

In some embodiments, the item matching service 550 or models 554 and 556 may be hosted in a machine learning service (MLS) designed to support large numbers of machine learning application to solve different problems. In some embodiments, the MLS may be configured to host machine learning applications for many different customers or clients. In some embodiments, the MLS may include a number of programmatic interfaces, such as application programming interfaces (APIs) defined by the service, which guide non-expert users to build and use machine learning models using machine learning best practices relatively quickly, without the users having to expend a lot of time and effort on tuning models, or on learning advanced statistics or artificial intelligence techniques. The interfaces may, for example, allow non-experts to rely on default settings or parameters for various aspects of the procedures used for building, training and using machine learning models, where the defaults are derived from the accumulated experience of other practitioners addressing similar types of machine learning problems. At the same time, expert users may customize the parameters or settings they wish to use for various types of machine learning tasks, such as input record handling, feature processing, model building, execution and evaluation. In at least some embodiments, in addition to or instead of using pre-defined libraries implementing various types of machine learning tasks, MLS clients may be able to extend the built-in capabilities of the service, e.g., by registering their own customized functions with the service. Depending on the business needs or goals of the clients that implement such customized modules or functions, the modules may in some cases be shared with other users of the service, while in other cases the use of the customized modules may be restricted to their implementers/owners.

In some embodiments, a machine learning toolkit may be provided to users to allow the users to build machine learning models or perform tasks of a given machine learning workflow. As with the MLS service, the toolkit may be used to program machine learning systems to perform tasks such as extracting records from data sources, generating statistics on the records, feature processing, model training, prediction, etc. An embodiment of the IPQ comparison model 556, for example, may be made available as a library in the toolkit, as one option to allow users to generate labels from text sequences. The users may then develop more complex or application-specific machine learning systems, using the text annotation system. In some embodiments, the toolkit may be used to generate a library of trained models, to be used with downstream item description analysis or machine learning systems.

As shown, in this example, two downstream systems 570 and 580 are shown. As shown, in some embodiments, these downstream systems may act as clients of the item matching service 550, and interact with the service through its service interface 552. In some embodiments, these downstream systems may interact more directly with the models 554 or 556, which may expose more low-level interfaces via the machine learning service 540.

In some embodiments, the attribute analysis system 570 may implement a comparison system to compare item attributes (e.g., the weight of the item(s), the overall dimensions of the item(s), the overall packaging dimensions to ship the item(s), a shipping fee to deliver the items, an overall price for the item(s), a per-unit price for the item(s), etc.). In some embodiments, this comparison may be performed only on item descriptions with matching IPQ values, as determined by the IPQ comparison model. In some embodiments, the attribute analysis system 575 may make one or more calls 575 to the item matching service 550 to determine groups of matching items having the same IPQ values, and perform the attribute analysis using these groups. In some embodiments, the attribute analysis system may be provided as another service that may be accessible to different clients 510 of the service provider network 530.

In some embodiments, the item catalog management system 580 may implement one or more functions to manage the item catalog 562. In some embodiments, the item catalog management system 580 may be implemented as another service, which may be provided to internal administrators of a particular item catalog, or to other authorized users of the service. In some embodiments, the item catalog management system may be used to fetch 585 a group of matching items with matching IPQ values, and possibly perform tasks such as item deduplication within the group of matching items. In some embodiments, the item catalog management system may implement other management functions, such as for example to automatically check new incoming item descriptions against the existing item descriptions in the catalog 562, or detect illegal IPQ variants within the item catalog 562.

Figure 6:
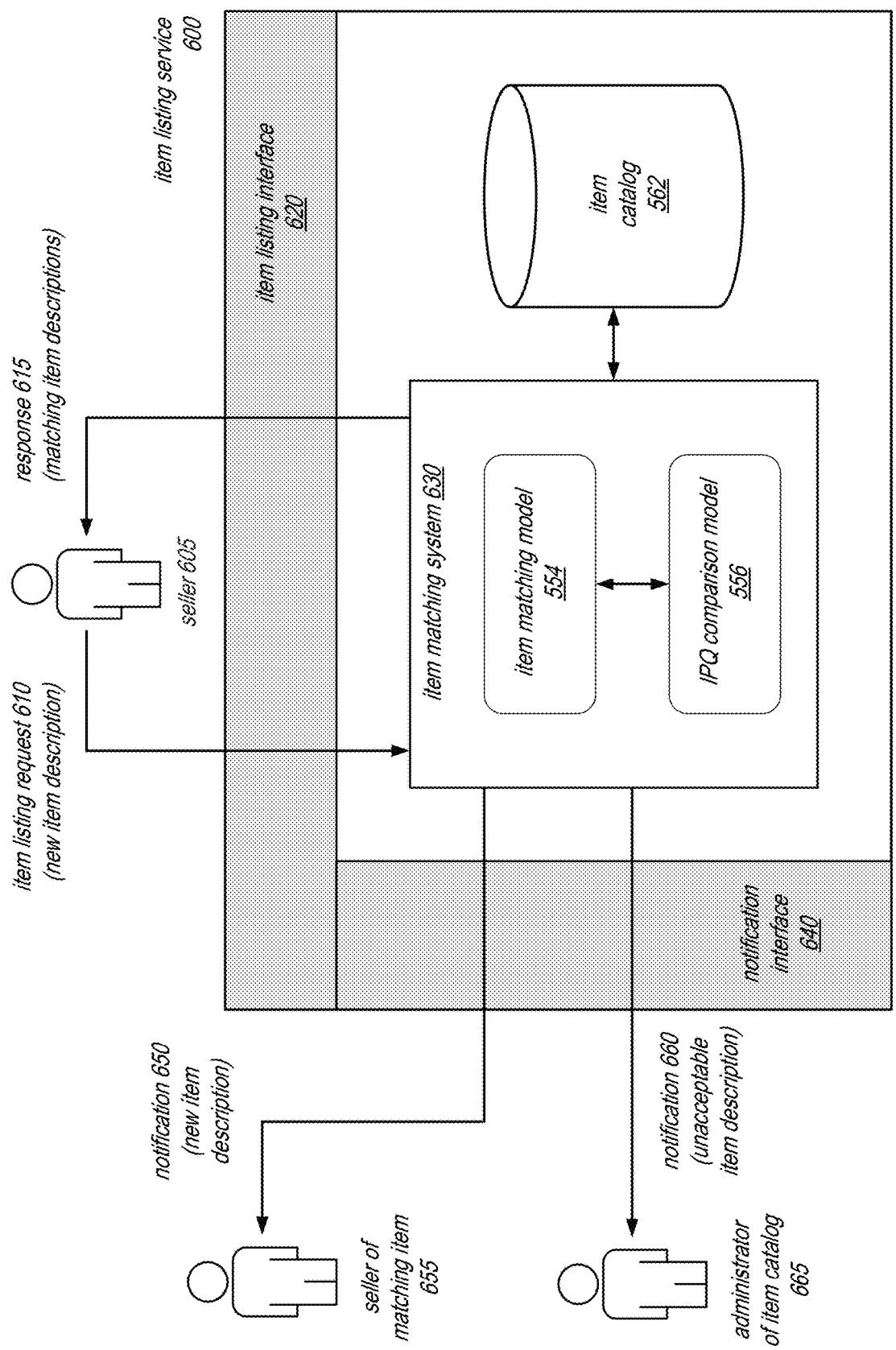
FIG. 6 illustrates an item listing service that uses an item matching service to provide user services in response to a new item listing, according to some embodiments.

FIG. 6 illustrates an item listing service that uses an item matching service to provide user services in response to a new item listing, according to some embodiments. As shown, the figure depicts an item listing service 600, which may be implemented as part of an e-commerce website that allow many third-party users to buy and sell items, in some embodiments. In some embodiments, the item listing service 600 may be implemented as another service in the service provider network 530 of FIG. 5.

As shown, in some embodiments, the item listing service 600 may implement an item listing interface 620. Depending on the embodiment, the item listing interface 620 may be implemented as a GUI, a command-line interface, an API, or some other type of interface, to allow users such as a seller 605 to submit item listing requests 610 to list items with the item listing service. As shown, in some embodiments, the item listing request 610 may indicate a new item description for the new item, for example, the item description 400 of FIG. 4A.

In some embodiments, as shown, an item matching system 630 may be used during the item listing process to improve the user experience of the seller 605. In some embodiments, the item matching system 630 may be implemented as a service, such as the item matching service 550 of FIG. 5. As shown, in some embodiments, the item matching system 630 may employ the item matching model 554 and the IPQ comparison model 556, to determine if two or more items represent a match. In some embodiments, the item matching system 630 may perform a search for matching items in the item catalog 562, and return any matching item descriptions as a response 615 back to the seller 605 during the item listing process. For example, a seller 605 that is listing a new product for sale (e.g. a type of apple juice) may automatically presented with a list of matching items with matching IPQs during the listing process. In this manner, the seller 605 can quickly review other competitive items listed in the service 600, to allow the seller to possibly adjust the pricing of the new item listing or other aspects of the new item listing.

As shown, in some embodiments, the item matching system 630 may also be accessed by other sellers 655 of the item listing service 600. In some embodiments, the item listing service 600 may provide a notification interface 640, which may allow other sellers 655 to register to receive notifications about matching items. For example, in some embodiments, when a new item (e.g. via request 610) is found to match an existing item listed in the item catalog 562, a registered seller 655 of the matching existing item may receive a notification 650 of the match. In some embodiments, the notification 650 may indicate the new item description, to allow the other seller 655 to see the new item that is competitive with his or her listed item. In this manner, the other seller 655 may take further steps to analyze the new item and possibly take action to adjust his or her listed item.

As shown, in some embodiments, the notification interface 640 may also be used to send notifications 660 to an administrator 665 of the item listing service. In some embodiments, the item matching system 630 may be used as part of a quality assurance measure or policy enforcement mechanism by the item listing service 600. For example, in some embodiments, the item listing service 600 may implement certain policies to forbid listings of some types of items or items with certain IPQ quantities. In some embodiments, such policies may be dictated by agreements with certain items. In some embodiments, the item matching system 630 may be used to ascertain that a new item description corresponds to an illegal IPQ variant of a product that is only manufactured in certain allowed IPQs (e.g., the new item description specifies an illegal combining of items). In some embodiments, upon such detection, the item matching system 630 may alert the administrator 665 via the notification interface 640, and provide the unacceptable item description. This notification 660 may indicate the reason for the alert, and make a recommendation as to how to manually review the new item description. In some embodiments, upon a detection of a certain type of unacceptable item listing, the item listing service 600 may simply reject the new item listing request 610.

Figure 7:
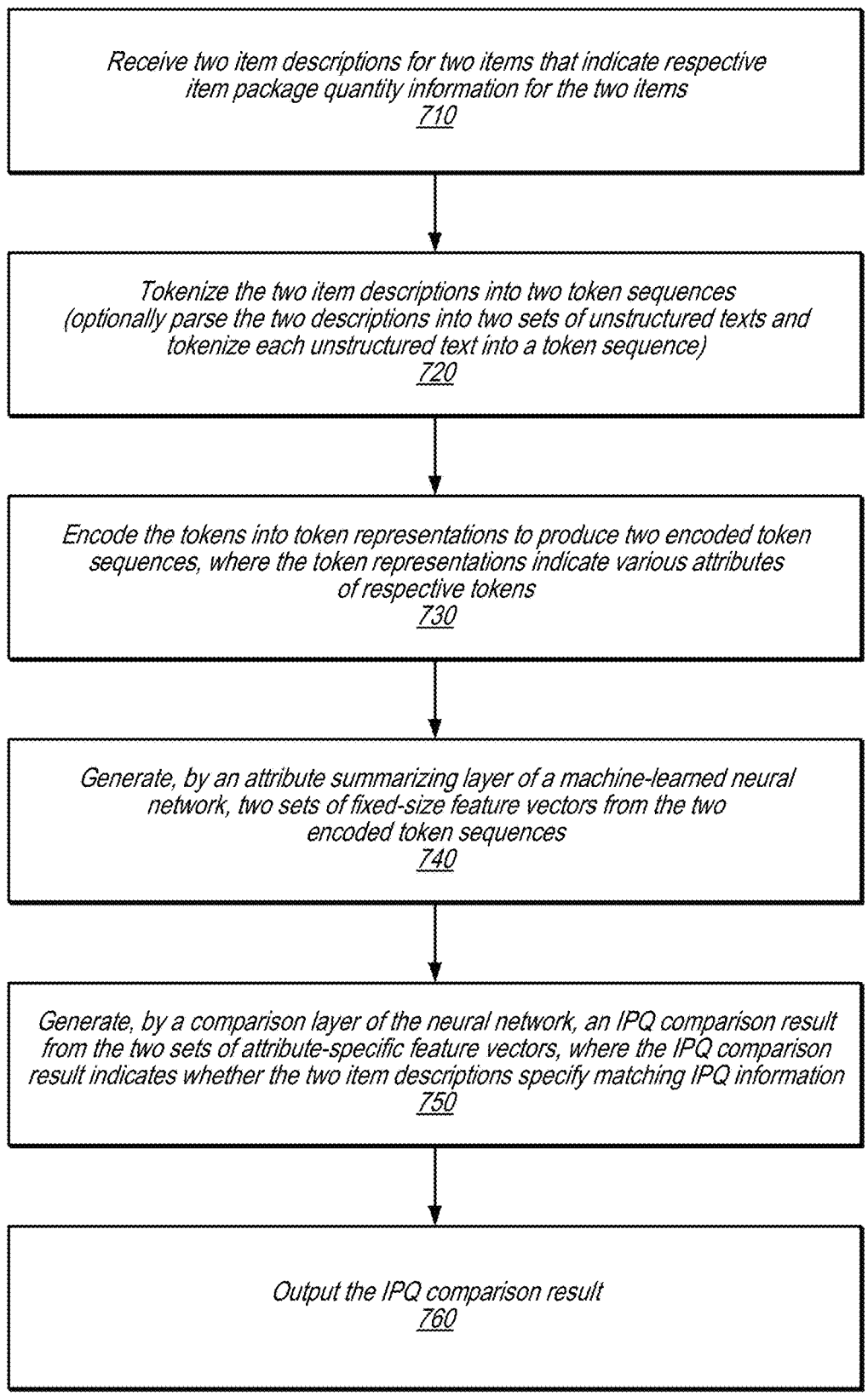
FIG. 7 is a flowchart illustrating a process of a machine learned IPQ comparison system generating an IPQ comparison result, according to some embodiments.

FIG. 7 is a flowchart illustrating a process of a machine learned IPQ comparison system generating an IPQ comparison result, according to some embodiments. In some embodiments, the depicted process may be performed by the IPQ comparison system 120, as discussed in connection with FIG. 1.

The process begins at operation 710, where two item descriptions are received. The two item descriptions may describe two items that indicate respective item package quantity information for the two items. In some embodiments, the two item descriptions may be the item descriptions 110a and 110b of FIG. 1. In some embodiments, each item description may include multiple fields of data, such as item description 400 of FIG. 4A. The item descriptions may include fields of textual or natural language data that may describe the IPQ information about the items. In some embodiments, more than two item descriptions may be received by the IPQ comparison system. In some embodiments, the two item descriptions may be formatted or structured different, or be in different languages.

At operation 720, the two item descriptions may be tokenized into two token sequences. In some embodiments, the two item descriptions may be combined into one token sequence that is separated by a delimiter. In some embodiments, the two item descriptions may be formatted as semi-structured text which include multiple fields of text. According, in some embodiments, each semi-structured text may be parsed to obtain its individual text fields, and each segment of unstructured text may then be provided to the IPQ comparison model to be tokenized into individual token sequences. In some embodiments, the tokenization may be performed by the IPQ comparison system using a module or component outside of the machine learned IPQ comparison model. In some embodiments, the tokenization may be performed by the IPQ comparison model itself. In some embodiments, the tokenization may be performed using a set of delimiters, such as bracket characters or semicolon characters. However, in some embodiments, the set of delimiters may exclude a set of secondary punctuation characters that frequently occur in the middle of IPQ descriptions. Examples of these secondary punctuation characters may include periods, commas, spaces, and forward slashes, depending on the embodiment. Because these secondary punctuation characters may indicate that the surrounding text indicates an IPQ description, these types of characters are not used as token delimiters, and their surrounding text can be passed to a next analysis layer (e.g. the neural network model) for deeper analysis.

At operation 730, the tokens in the two token sequences are encoded into token representations to produce two encoded token sequences, where the token representations indicate various attributes of respective tokens. In some embodiments, the two encoded token sequences may be the sequences 136a and 136b of FIG. 1. In some embodiments, each encoded token representation may correspond to a token in the unencoded token sequence. In some embodiments, the number of token level attributes may be added to each token representation. In some embodiments, these attributes may be obtained using one or more token-to-attribute dictionaries (e.g. dictionary 134 of FIG. 1). In some embodiments, the token attributes used may include an attribute indicating that a given token indicates a quantity of one, which may be treated as a special quantity by the neural network model. Depending on the embodiment, the token attributes may also include one or more of: an semantic embedding of the token, an attribute indicating that a token is a quantity that is used to describe IPQs, an attribute indicating that a token is a unit or collection noun that is used to describe IPQs, an attribute indicating that a token is a concrete noun, an attribute indicating that a token is a negative token that is not used to describe IPQs, an attribute indicating that a token is the single letter word "x", an attribute indicating a number of characters in a token, an attribute indicating capitalization information for a token; and a attribute indicating that a given token occurs in the other item description and is associated with at least one of the attributes in the other encoded token sequence. Depending on the embodiment, some of these attributes may be combined into composite attributes. In other embodiments, additional types of token attributes may also be used.

At operation 740, an attribute summarizing layer of a machine-learned neural network is used to generate two sets of fixed-size feature vectors from the two encoded token sequences. In some embodiments, the attribute summarizing layer may be the attribute summarizing layer 140 of FIG. 1. In some embodiments, the attribute summarizing layer may include a CNN to process each encoded token sequence to generate a feature map set.

At operation 750, a comparison layer of the neural network is used to generate an IPQ comparison result from the two sets of fixed-size feature vectors, where the IPQ comparison result indicates whether the two item descriptions specify matching IPQ information. In some embodiments, the comparison layer may be comparison layer 150 of FIG. 1, and the IPQ comparison result may be the IPQ comparison result 160 of FIG. 1. In some embodiments, the comparison layer may be a fully connected layer where the nodes of the layer are connected to each input signal (e.g. the feature vectors from the attribute summary layer). In some embodiments, the IPQ comparison result may simply be a Boolean value that indicates whether the two item descriptions have matching IPQ information. In some embodiments, more detailed or additional input may be generated by the comparison layer, such as a confidence value, one or more intermediate values obtained by the model, or a more detailed result indicating how the IPQ information of the two item descriptions are different.

At operation 760, the IPQ comparison result is outputted. In some embodiments, this result may be outputted via an interface of the IPQ comparison system, which may be the same interface as the input interface that received the two item descriptions. In some embodiments, the output may simply be a model output signal that is provided to another computer system or a downstream machine learned model.

Figure 8:
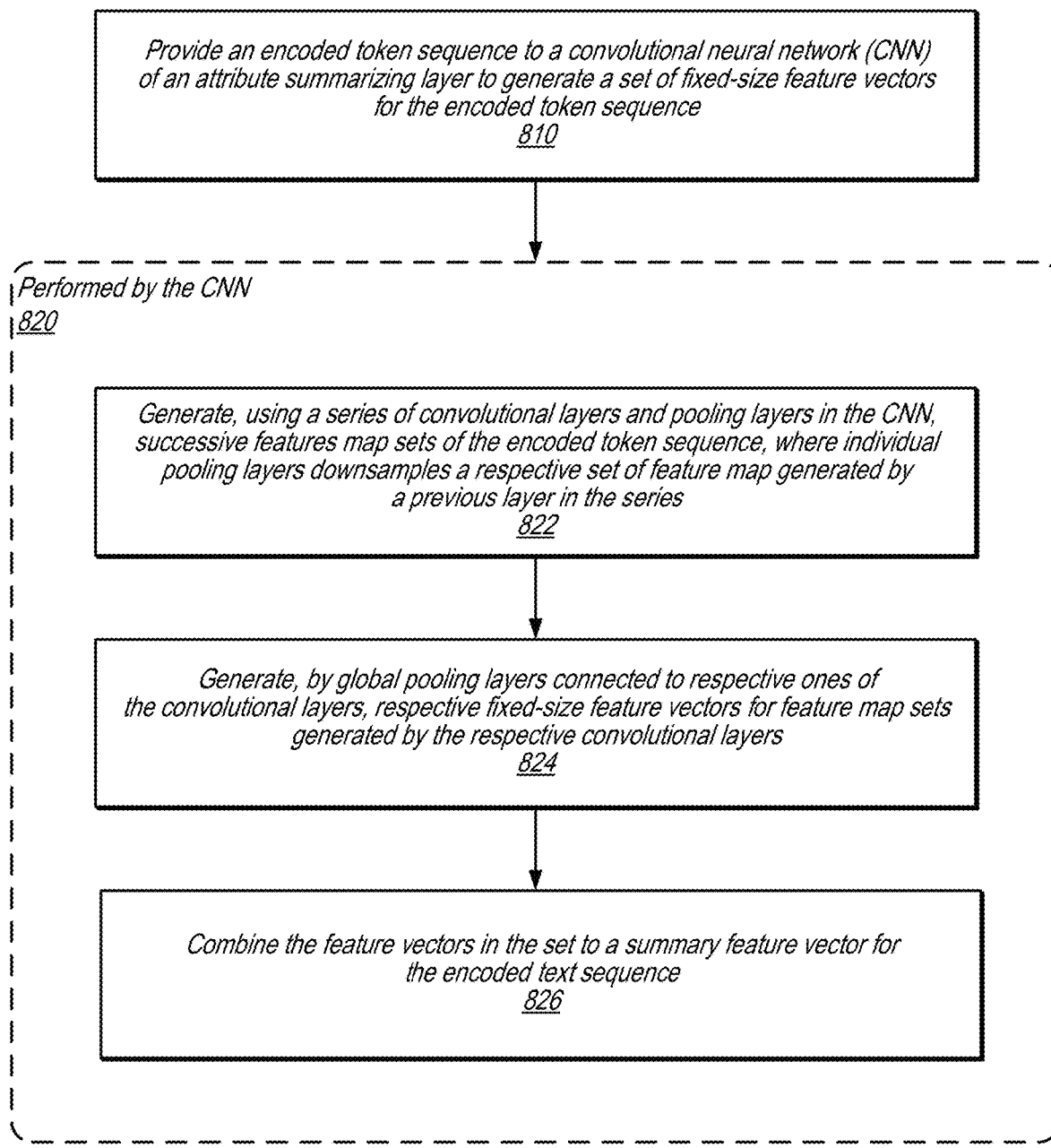
FIG. 8 is a flowchart illustrating a process of a convolutional neural network (CNN) generating a fixed-size feature vector in an IPQ comparison system, according to some embodiments.

FIG. 8 is a flowchart illustrating a process of a convolutional neural network (CNN) generating a fixed-size feature vector in an IPQ comparison system, according to some embodiments. In some embodiments, the depicted process of this figure may be performed by the CNNs 144 as discussed in connection with FIGS. 1 and 3. In some embodiments, the depicted process may be a more detailed discussion of operation 740 in FIG. 7.

At operation 810, an encoded token sequence is provided to a CNN of an attribute summarizing layer to generate a fixed-size feature vector for the encoded token sequence. As discussed, in some embodiments, the CNN may be the CNN of FIGS. 1 and 3, and the encoded token sequence may be the sequence 136 of FIGS. 1 and 3.

As shown, the next operations 822, 824, and 826 are a group of operations 820 that are performed by the CNN. At operation 822, a series of convolutional layers and pooling layers in the CNN is used to generate successive features map sets of the encoded token sequence, where individual pooling layers downsamples a respective feature maps in the set generated by a previous layer in the series. In some embodiments, the CNN may include a stack or series of convolutional layers and pooling layers (such as max pooling layers). In some embodiments, the convolutional layers may apply a kernel or filter to "blur" the attributes in the sequence of tokens to include some of the features of its surrounding neighbor tokens. In some embodiments, the max pooling layers may be used to progressively reduce the size of the feature maps in the set. Depending on the embodiment, the CNN may employ different numbers of convolution or pooling layers as shown in FIG. 3, and may employ different layer parameters such as numbers of kernels, kernel size, window size, and/or stride size in the layers.

At operation 824, a number of global pooling layers connected to respective ones of the convolutional layers are used to generate respective fixed-size feature vector for the feature map sets generated by the respective convolutional layers. In some embodiments, the global pooling layers may be the global max pooling layers (e.g. layer 324) shown in FIG. 3. In some embodiments, these global pooling layers may have a window size that is the same as the size or length of the input feature maps. Accordingly, these global pooling layers effectively removes the length variability of the input feature maps. In some embodiments, each convolution layer (e.g. layer 312) in the stack may be associated with a global pooling layer. In some embodiments, some of the convolution layers may not be associated with a global pooling layer. In some embodiments, as shown in FIG. 3, a number of these global pooling layers may be used at different "resolution" levels of the encoded token sequence, to generate different fixed-size feature vectors for the encoded token sequence.

At operation 826, the fixed-size feature vectors generated by the global pooling layers are combined to form the final summary feature vector for the encoded text sequence. As may be understood, because each of the feature vector is fixed in size (e.g. their size is not dependent on the size of the input token sequence), the combined summary feature vector is also fixed in size (e.g. dependent only on the number of global pooling layers). In some embodiments, the combination of the fixed-size feature vectors may simply be a concatenation of these values. In some embodiments, and additional layer (e.g. a dense layer 350) may be used to further process the feature vectors to produce a more succinct summary feature vector. As discussed, all feature vectors generated for both item descriptions may then be used by the comparison layer 150 to generate the ultimate output of the IPQ comparison model.

Figure 9:
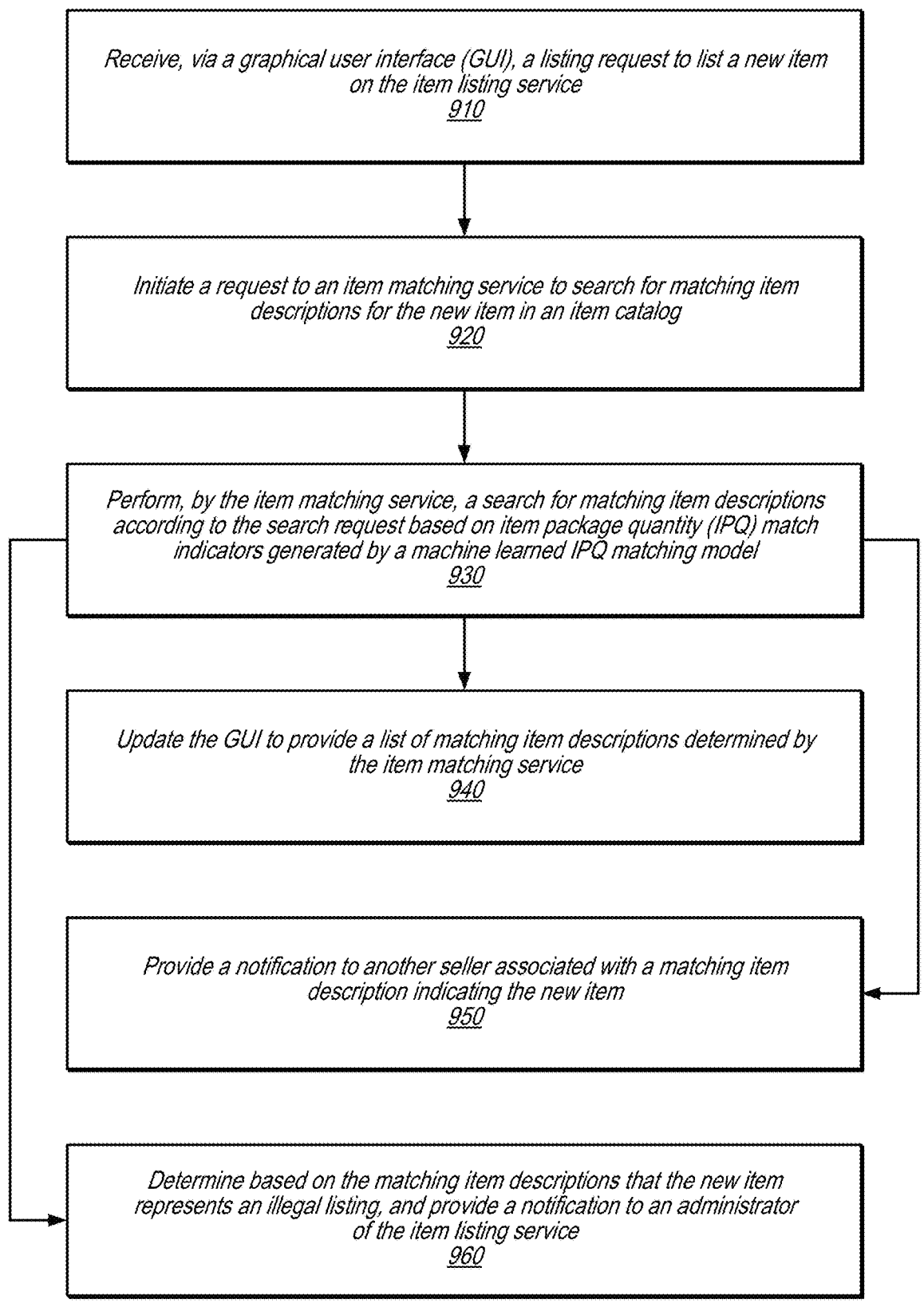
FIG. 9 is a flowchart illustrating a process of an item listing service processing a new item listing using a machine learned item matching service, according to some embodiments.

FIG. 9 is a flowchart illustrating a process of an item listing service processing a new item listing using a machine learned item matching service, according to some embodiments. In some embodiments, the process depicted in the figure may be performed by an item listing service, such as the item listing service 600 of FIG. 6.

At operation 910, a listing request to list a new item on the item listing service is received via a graphical user interface (GUI) of the item listing service. As discussed in connection with FIG. 6, in some embodiments, the item listing service may be implemented as part of an e-commerce website or online system that allows third-party sellers to list items for sale, and third-party buyers to buy the items listed. In some embodiments, the item listing request may specify an item description for the new item, such as item description 400 of FIG. 4A.

At operation 920, the item listing service initiates a request to an item matching service to search for matching item descriptions for the new item in an item catalog. In some embodiments, the item matching service may be service 550 of FIG. 5, and may implement the item matching system 630 of FIG. 6. In some embodiments, the item catalog may be the item catalog 562 of FIGS. 5 and 6, which may be used to store item descriptions of a large number of items.

At operation 930, the item matching service performs the search for matching item descriptions according to the search request based on item package quantity (IPQ) match indicators generated by a machine learned IPQ matching model. In some embodiments, the IPQ matching model may be the IPQ comparison model 554 of FIGS. 5 and 6, or the neural network 122 of FIG. 1. As discussed, in some embodiments, these models may be machine trained to determine whether two or more item descriptions are matching, including whether the item descriptions have matching IPQ information. Based on on the IPQ comparison results generated by the IPQ matching model, a list of item descriptions matching the new item may be determined. Depending on the embodiment, different actions such as operations 940, 950, and 960 may be taken based on the list of matching item descriptions.

At operation 940, the GUI accepting the seller's item listing request may be updated to provide the list of matching item descriptions determined by the item matching service. As discussed, in some embodiments, the item listing service may be implemented as a website, and the GUI may be a webpage generated by the web server associated with the website. In some embodiments, as the seller goes through the process of listing a new item, the webpage or GUI may be updated to show matching items that are competitive with the new item being listed. Accordingly, the seller may use this information to adjust the item description or pricing of the new item.

At operation 950, a notification is provided to another seller associated with a matching item description, where the notification indicates the new item. In some embodiments, this notification may be performed via the notification interface 640 of FIG. 6. As discussed, in some embodiments, the item listing service may allow sellers to register to the service to receive notifications when similar or matching items are listed no the service. Accordingly, the registered seller can examine these new items and appropriate take action with respect to their own items listed on the service.

At operation 960, a determination is made by the item listing service that the new item represents an illegal listing, based on the list of matching items descriptions determined by the item matching service. In some embodiments, once this determination is made, a notification may be provided to an administrator of the item listing service. In some embodiments, this notification may be the notification 660 of FIG. 6. Thus, in some embodiments, the item matching service may be used to screen new items being listed, for example, to detect an illegal item package variant of an item. These illegal item package variants may be prohibited for listing on the item listing service. In some embodiments, when an illegal item listing is detected, the item listing service may flag the listing for manual review by the administrator, and not automatically publish the new item listing on the item listing service.

Figure 10:
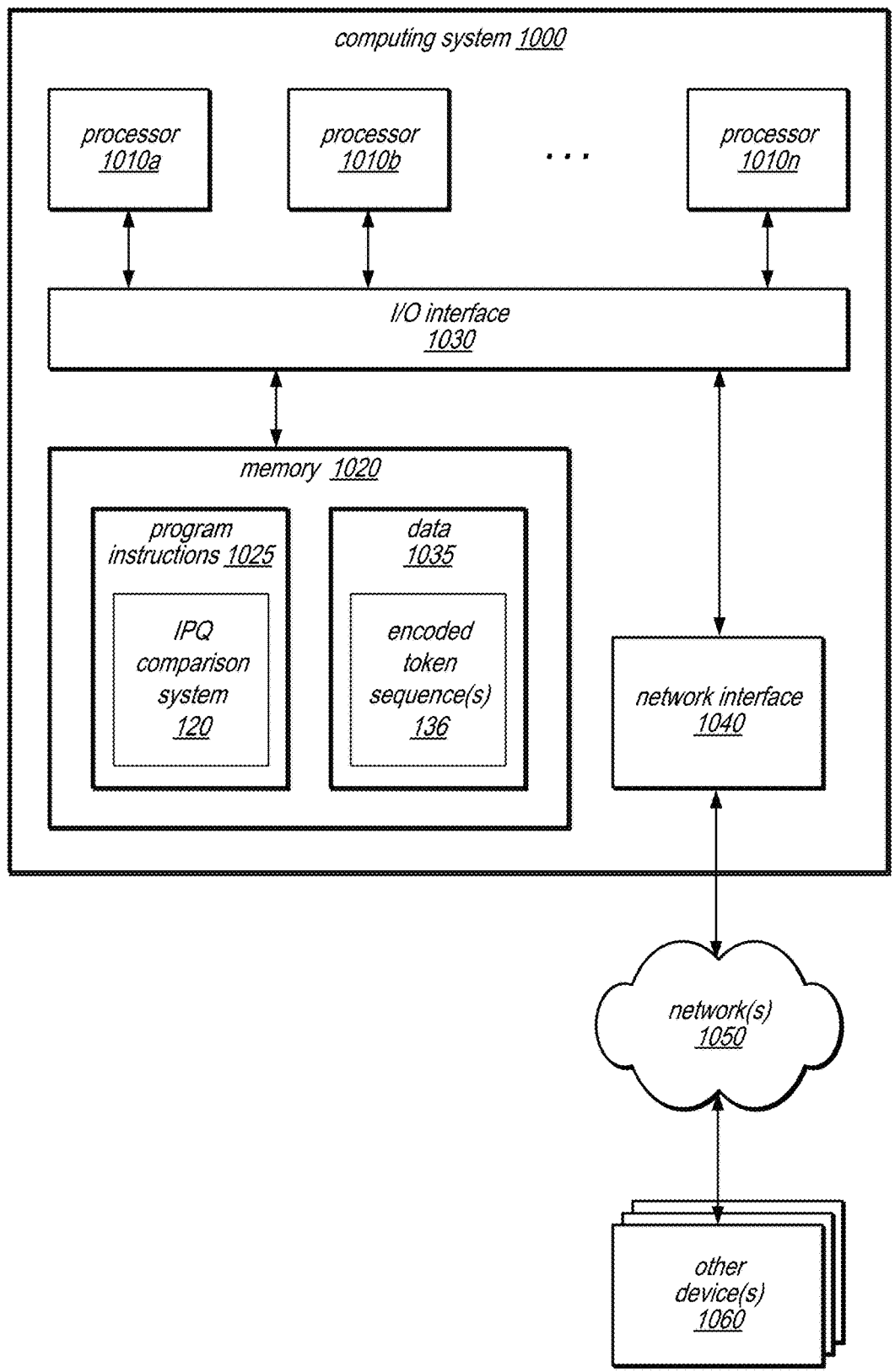
FIG. 10 is a block diagram illustrating an example computer system that can be used to implement one or more portions of a machine learned item package quantity (IPQ) comparison system, according to some embodiments.

FIG. 10 is a block diagram illustrating an example computer system that can be used to implement one or more portions of a machine learned item package quantity (IPQ) comparison system, according to some embodiments. Computer system 1000 may include or be configured to access one or more nonvolatile computer-accessible media. In the illustrated embodiment, computer system 1000 includes one or more processors 910 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement one or more executable components such as the IPQ comparison system 120 of FIG. 1. As shown, in some embodiments, the data memory 1035 may be used to store data such as the encoded token sequences 136 of FIG. 1.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more hardware processors with associated memory that implement an item package quantity (IPQ) comparison system, configured with computer executable instructions to:
receive two descriptions that indicate respective IPQ information for the two respective items;
tokenize the two item descriptions into two respective token sequences;
provide the two token sequences to a machine-learned neural network, wherein the neural network includes:
a token encoding layer to encode individual tokens in the two token sequences into respective token representations, wherein individual ones of the token representations indicate a plurality of attributes of respective tokens, including:
a semantic embedding of a respective token,
an indication of whether the respective token is a quantity that is used to describe IPQs, and
an indication of whether the respective token is a unit that is used to describe IPQs;
an attribute summarizing layer connected to the tokenization layer to consume two encoded token sequences and generate two respective sets of fixed-size feature vectors for the two encoded token sequences; and
a comparison layer connected to the attribute summarizing layer to consume the two sets of fixed-size feature vectors and generate an IPQ comparison result that indicates whether the two item descriptions specify matching IPQ information; and
output the IPQ comparison result.

2. The system of claim 1, wherein the plurality of attributes in the plurality of attributes further include one or more of:
an attribute indicating that a given token indicates a quantity of one;
an attribute indicating a part of speech of a given token in the item description;
an attribute indicating that a given token is a negative token that is not used to describe IPQs;
an attribute indicating that a given token is a single letter word "x";
an attribute indicating a number of characters in a given token;
an attribute indicating capitalization information for a given token; or
an attribute indicating that a given token occurs in the other one of the two item descriptions and is associated with at least one of the plurality of attributes in the other encoded token sequence.

3. The system of claim 1, wherein the attribute summarizing layer comprises a convolutional neural network (CNN) that includes:
a series of convolutional layers and pooling layers that generate successive features map sets of the encoded token sequence, wherein individual ones of the pooling layers downsamples a respective set of feature maps generated by a previous layer in the series; and
a plurality of global pooling layers connected to respective ones of the convolutional layers, wherein individual ones of the global pooling layers generates a fixed-size feature vector for a respective feature map set generated by a respective convolutional layer.

4. The system of claim 1, wherein the IPQ comparison system is implemented as part of an item comparison system, configured to:
determine whether the two item descriptions refer to a matching item, based at least in part on the IPQ comparison result; and
responsive to the determination that the two item descriptions refer to a matching item, perform an attribute comparison analysis for the two item descriptions and output results of the attribute comparison analysis.

5. The system of claim 1, wherein the IPQ comparison system is implemented as part of an item matching service, configured to:
receive, via a service interface, a request to search for item descriptions in a catalog that match an input item description;
perform a search for matching item descriptions according to the request and based at least in part on the IPQ comparison system; and
return, via the service interface, a response indicating the matching item descriptions.

6. A method comprising:
performing, by one or more hardware processors with associated memory that implement an item package quantity (IPQ) comparison system:
receiving two item descriptions for two items that indicate respective IPQ information for the two items;

tokenizing the two item descriptions into two respective token sequences of tokens;
encoding individual tokens in the two token sequences into respective token representations to produce two encoded token sequences, wherein individual ones of the token representations indicate a plurality of attributes of respective tokens;
generating, by an attribute summarizing layer of a machine-learned neural network, two respective sets of fixed-size feature vectors for the two encoded token sequences; and
generating, by a comparison layer of the neural network, an IPQ comparison result according to the two sets of fixed-size feature vectors, wherein the IPQ comparison result indicates whether the two item descriptions specify matching IPQ information.

7. The method of claim 6, wherein at least some of the attributes are determined using a token-to-attribute dictionary, and the plurality of attributes include two or more of:
an attribute indicating that a given token is a quantity that is used to describe IPQs;
an attribute indicating that a given token is a unit that is used to describe IPQs;
an attribute indicating that a given token is not used to describe IPQs;
an attribute indicating a part of speech of a given token in the item description;
an attribute indicating that a given token is a single letter word "x"; or
an attribute indicating that a given token occurs in the other one of the two item descriptions and is associated with at least one of the plurality of attributes in the other encoded token sequence.

8. The method of claim 6, wherein the plurality of attributes includes an attribute indicating that a given token indicates a quantity of one.

9. The method of claim 6, wherein:
said tokenizing of the two item descriptions is performed according to a first set of delimiters, wherein the first set of delimiters does not include a set of secondary punctuation characters; and
said encoding of the tokens comprises adding an attribute to the token representations indicating that a respective token is one of the secondary punctuation characters.

10. The method of claim 6, wherein said tokenizing the two item descriptions includes:
parsing at least one of the two item descriptions describing an item to obtain multiple fields of data, including two or more of: a title of the item description, an unstructured textual description of the item, and a customer comment about the item; and
parsing the fields of data to into respective token sequences for input to the machine-learned neural network.

11. The method of claim 10, further comprising performing, by the IPQ comparison system:
obtaining item packaging information associated with the item description provided from an item packaging data store; and
parsing the item packaging information to generate one of the token sequences.

12. The method of claim 6, wherein:
the attribute summarizing layer includes a convolutional neural network (CNN); and
said generating one of the fixed-size feature vectors for one of the encoded token sequences includes:

generating, by the CNN, using a series of convolutional layers and pooling layers in the CNN, successive features map sets of the encoded token sequence, wherein individual ones of the pooling layers down-samples a respective set of feature maps generated by a previous layer in the series; and
generating, by a global pooling layer connected to a respective one of the convolutional layers, the fixed-size feature vector for a respective feature map set generated by the respective convolutional layer.

13. The method of claim 6, wherein the IPQ comparison system is implemented as part of an item matching service, and further comprising performing, by the item matching service:
receiving, via a service interface, a request to match the two item descriptions for the two items;
providing the two item descriptions to a machine learned item matching model to determine whether the two items descriptions refer to a matching item, wherein the determination is made based at least in part on the IPQ comparison result; and
returning, via the service interface, a response indicating whether two items descriptions refer to a matching item.

14. The method of claim 13, further comprising:
responsive to the determination that the two item descriptions refer to a matching item, performing an attribute comparison analysis for the two item descriptions and outputting results of the attribute comparison analysis.

15. The method of claim 6, wherein the IPQ comparison system is implemented as part of an item matching service, and further comprising performing, by the item matching service:
receiving, via a service interface, a request to search for item descriptions in a catalog that match an input item description;
performing a search for matching item descriptions according to the request and based at least in part on the IPQ comparison system; and
returning, via the service interface, a response indicating the matching item descriptions.

16. The method of claim 15, wherein the item matching service is implemented as part of an item listing service that allows sellers to list items for sale, and further comprising performing, by the item listing service:
receiving, via a graphical user interface (GUI), a listing request to list a new item on the item listing service;
responsive to the listing request, initiating the request to the item matching service to search for matching item descriptions in the catalog for the new item; and
responsive to the response indicating the matching item descriptions, causing the GUI to be updated to provide the matching item descriptions.

17. One or more non-transitory computer-accessible storage media storing program instructions that when executed on one or more processors of an item package quantity (IPQ) comparison system, cause the IPQ comparison system to:
receive two item descriptions for two items that indicate respective IPQ information for the two items;
tokenize the two item descriptions into two respective token sequences of tokens;
encode individual tokens in the two token sequences into respective token representations to produce two encoded token sequences, wherein individual ones of the token representations indicate a plurality of attributes of respective tokens;

generate, by an attribute summarizing layer of a machine-learned neural network, two respective sets of fixed-size feature vectors from the two encoded token sequences; and generate, by a comparison layer of the neural network, an IPQ comparison result according to the two sets of fixed-size feature vectors, wherein the IPQ comparison result indicates whether the two item descriptions specify matching IPQ information.

18. The non-transitory computer-accessible storage media of claim 17, wherein the plurality of attributes include two or more of:

an attribute indicating that a given token is a quantity that is used to describe IPQs;

an attribute indicating that a given token indicates a quantity of one;

an attribute indicating that a given token is a unit that is used to describe IPQs;

an attribute indicating that a given token is not used to describe IPQs;

an attribute indicating a part of speech of a given token in the item description; or an attribute indicating that a given token is a single letter word "x".

19. The non-transitory computer-accessible storage media of claim 17, wherein:

the attribute summarizing layer includes a convolutional neural network (CNN); and to generate one of the fixed-size feature vectors for one of the encoded token sequences, the program instructions when executed on the one or more processors cause the IPQ comparison system to:

generate, by the CNN and using a series of convolutional layers and pooling layers in the CNN, successive features map sets of the encoded token sequence, wherein individual ones of the pooling layers downsamples a respective set of feature maps generated by a previous layer in the series; and generate, by a global pooling layer connected to a respective one of the convolutional layers, the fixed-size feature vector for a respective feature map set generated by the respective convolutional layer.

20. The non-transitory computer-accessible storage media of claim 17, wherein the program instructions when executed on the one or more processors cause the IPQ comparison system to:

receive, via a service interface, a request to match the two item descriptions for the two items;

provide the two item descriptions to a machine learned item matching model to determine whether the two items descriptions refer to a matching item, wherein the determination is made based at least in part on the IPQ comparison result; and return, via the service interface, a response indicating whether two items descriptions refer to a matching item.

* * * * *